US009360813B2

(12) United States Patent
Okano

(10) Patent No.: US 9,360,813 B2
(45) Date of Patent: Jun. 7, 2016

(54) IMAGE PROCESSING APPARATUS

(75) Inventor: Tetsuya Okano, Anjo (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 664 days.

(21) Appl. No.: 13/049,240

(22) Filed: Mar. 16, 2011

(65) Prior Publication Data

US 2011/0279876 A1 Nov. 17, 2011

(30) Foreign Application Priority Data

May 12, 2010 (JP) ................................. 2010-110356

(51) Int. Cl.
*G06K 15/00* (2006.01)
*H04N 1/04* (2006.01)
*G03G 15/23* (2006.01)

(52) U.S. Cl.
CPC ...... *G03G 15/234* (2013.01); *G03G 2215/0141* (2013.01)

(58) Field of Classification Search
USPC ................. 358/498, 296, 496, 401, 501, 1.12
See application file for complete search history.

(56) References Cited

U.S. PATENT DOCUMENTS 6,577,844 B2 6/2003 Kamei
7,623,277 B2 * 11/2009 Wang ..................... G03B 27/52 271/186
8,928,951 B2 * 1/2015 Utsunomiya ...... H04N 1/00801 358/461
2002/0061215 A1 * 5/2002 Kamei .......................... 399/401
2004/0120744 A1 * 6/2004 Fukada et al. ................ 399/401
2005/0271411 A1 * 12/2005 Shibaki et al. .................. 399/82
2008/0253818 A1 10/2008 Sasaki et al.
2012/0134732 A1 * 5/2012 Okano ....................... B41J 3/60 400/611
2014/0001698 A1 * 1/2014 Okano ..................... B65H 7/00 271/10.01
2014/0320873 A1 * 10/2014 Kato ................. H04N 1/00578 358/1.12

FOREIGN PATENT DOCUMENTS

CN 101683782 A 3/2010
JP 8-113434 5/1996
JP 8-234516 9/1996
JP A-H10-316317 12/1998

(Continued)

OTHER PUBLICATIONS

Extended European Search Report dated Sep. 13, 2011 from related European Patent Application 11158127.8.

(Continued)

*Primary Examiner* — Cheukfan Lee
(74) *Attorney, Agent, or Firm* — Scully, Scott, Murphy & Presser, P.C.

(57) ABSTRACT

An image processing apparatus includes: an image processing unit; a discharge unit to which a recording medium is discharged; a first conveyance path for conveying the recording medium from the image processing unit to the discharge unit; a second conveyance path having a part overlapped with the first conveyance path and for reversing and conveying the recording medium from the overlapped part to the image processing unit through a path different from the first conveyance path; a first rotary member that is arranged at the overlapped part; and a control unit that controls the first rotary member, wherein the control unit makes the recording medium stand by at a position including at least the overlapped part before the recording medium is conveyed to the image processing unit through the second conveyance path.

19 Claims, 15 Drawing Sheets

(56) References Cited

FOREIGN PATENT DOCUMENTS

| | | |
|---|---|---|
| JP | 2001-166638 | 6/2001 |
| JP | 2002-145535 | 5/2002 |
| JP | 2002-365862 | 12/2002 |
| JP | A-2003-316208 | 11/2003 |
| JP | A-2004-307165 | 11/2004 |
| JP | 2008-260598 | 10/2008 |
| JP | 2009-96600 | 5/2009 |
| JP | A-2010-76908 | 4/2010 |

OTHER PUBLICATIONS

Notification of Reasons for Refusal dated May 8, 2012 received from the Japanese Patent Office from related Japanese Application No. 2010-110356, together with an English-language translation.

Decision of Patent Grant dated Oct. 11, 2012 received from the Japanese Patent Office from related Japanese Application No. 2010-110356, together with an English-language translation.

Official Action dated Aug. 27, 2013 received from the Chinese Patent Office in related CN application 201110077212.6 together with English translation.

* cited by examiner

IMAGE PROCESSING APPARATUS

CROSS REFERENCE TO RELATED APPLICATION

The present application claims priority from Japanese Patent Application No. 2010-110356, which was filed on May 12, 2010, the disclosure of which is herein incorporated by reference in its entirety.

TECHNICAL FIELD

Apparatuses and devices consistent with the present invention relate to an image processing apparatus.

BACKGROUND

An image forming apparatus (which is an example of an image processing apparatus) has been conventionally used. Regarding the image forming apparatus, an image forming apparatus has been known which forms images on both sides of a sheet and has a reversal mechanism for reversing a sheet. Regarding the image forming apparatus having the reversal mechanism, an image forming apparatus has been also known which forms an image on one side of a first sheet and then forms an image on a second sheet while reversing the first sheet and forming an image on the other side of the first sheet and has a standby mechanism for making the first sheet stand by until an image forming operation for the second sheet is completed. The image forming apparatus can effectively form images on both sides of a sheet by the reversal mechanism or standby mechanism.

SUMMARY

In the image forming apparatus, it is difficult to secure a space for mounting the reversal mechanism or standby mechanism in the apparatus with respect to miniaturization of the apparatus. When the reversal mechanism or standby mechanism is mounted at a position inside the apparatus, to which it is relatively difficult to access, considering miniaturization of the apparatus, if an image processing operation is interrupted due to some causes, it is difficult to collect a sheet in the apparatus. Thus, a time period during which the image processing operation is interrupted and then resumed is prolonged, so that the convenience is deteriorated.

The invention has been made to solve the above problem and an object of the invention is to provide a technology capable of making an image processing apparatus small and preventing the convenience from being deteriorated.

The invention relates to an image processing apparatus. An image processing apparatus of the first invention includes an image processing unit, a discharge unit, a first conveyance path, a second conveyance path, a first rotary member and a control unit. The image processing unit processes an image by using a recording medium. Here, the configuration of "processing an image by using a recording medium" includes processing an image "obtained from" a recording medium and processing an image "to" a recording medium, for example. The recording medium having an image processed in the image processing unit is discharged to the discharge unit. The first conveyance path is a conveyance path for conveying the recording medium from the image processing unit to the discharge unit. The second conveyance path is a conveyance path having a part overlapped with the first conveyance path and for reversing and conveying the recording medium from the overlapped part to the image processing unit through a path different from the first conveyance path. The first rotary member is arranged at the overlapped part. The control unit controls the first rotary member as follows.

(1) The control unit rotates the first rotary member in a first direction when conveying the recording medium to the discharge unit through the first conveyance path.

(2) The control unit rotates the first rotary member in a second direction reverse to the first direction when conveying the recording medium to the image processing unit through the second conveyance path.

(3) The control unit stops rotation of the first rotary member when making the recording medium stand by at the overlapped part.

When performing the control of (3), the control unit of the invention makes the recording medium stand by at a position including at least the overlapped part before the recording medium is conveyed to the image processing unit through the second conveyance path.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

First Illustrative Embodiment

A first illustrative embodiment of the invention will be described with reference to FIGS. 1 to 12.

1. Overall Configuration of Printer

Figure 1:
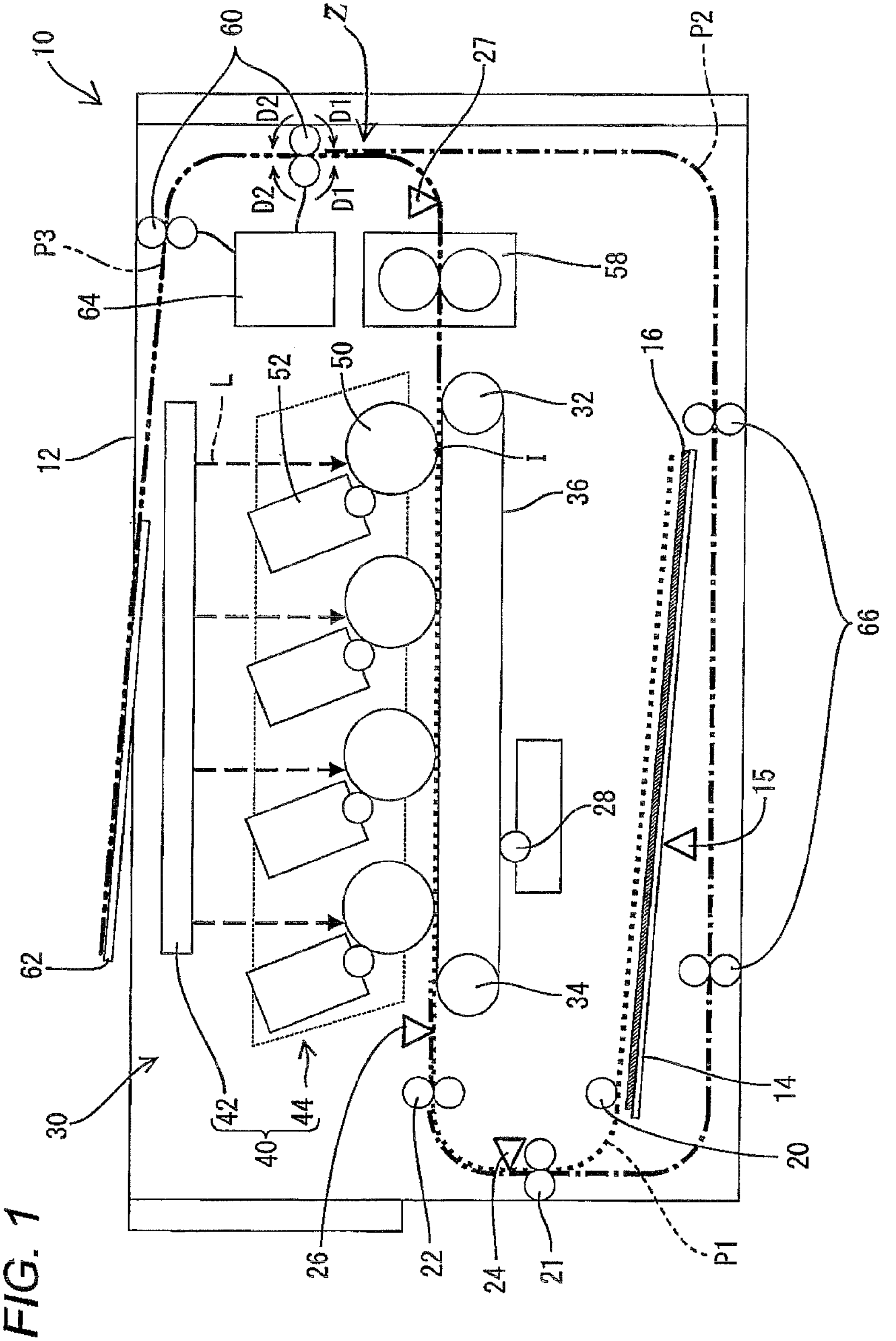
FIG. 1 is a side sectional view of a printer 10.

FIG. 1 is a side sectional view showing a schematic configuration of a printer 10 of this illustrative embodiment. As shown in FIG. 1, the printer 10 (which is an example of an image processing apparatus) is a color printer of a direct transfer tandem type that uses toners of four colors (yellow, magenta, cyan and black) to form a color image, and is configured in a casing 12. In the casing 12, a feeder tray 14 (which is an example of a feeder unit) in which sheets 16 (which are an example of a recording medium) are stacked. The feeder tray 14 is configured so that it can be opened and closed and the feeder tray 14 is provided with an optical sensor 15 (which is an example of a second detection unit) that detects whether the feeder tray is opened or closed.

The sheet 16 is stacked in the feeder tray 14 by a user. When the sheet 16 is stored in the casing 12, it is pressed by a pickup roller 20. The sheet 16 is conveyed to conveyance rollers 21 and register rollers 22 by rotation of the pickup roller 20. After the sheet 16 is deflection-corrected by the register rollers 22, it is conveyed to an image forming unit 30. In other words, the sheet 16 is conveyed from the feeder tray 14 to the image forming unit 30 (which is an example of an image processing unit) through a first feeding path P1 (dotted line) configured by the pickup roller 20, the conveyance rollers 21 and the register rollers 22. Optical sensors 24, 26 (which are an example of a first detection unit) are arranged on the first feeding path P1. The optical sensors 24, 26 detect a position of the sheet 16 that is being conveyed through the first feeding path P1. When the sheet 16 exists at positions of the first feeding path P1 at which the optical sensors 24, 26 are arranged, the optical sensors 24, 26 become on, otherwise the optical sensors become off.

The image forming unit 30 includes a pair of support rollers 32, 34 and a belt 36. The belt 36 is built between the support rollers 32, 34 and has a ring shape. The support rollers 32, 34 are rotated in a clockwise direction by a motor (not shown) and the belt 36 is thus moved. The sheet 16 delivered to the image forming unit 30 is conveyed to a sheet discharge unit 62 (which is an example of a discharge unit) as the belt 35 is rotated.

A cleaning roller 28 is provided on a lower side of the belt 36. The cleaning roller 28 removes toner or sheet powder attached to the belt 36.

An image forming section 40 is provided above the belt 36. The image forming section 40 includes a scanner unit 42 and a process unit 44. The process unit 44 includes four photosensitive drums 50 corresponding to toners of four colors, developing cartridges 52 and the like. Toners are filled in the developing cartridges 52 and the toners in the developing cartridges 52 are supplied to the photosensitive drums 50. The scanner unit 42 is arranged above the four photosensitive drums 50 of the process unit 44. The scanner unit 42 irradiates laser light L on the photosensitive drums 50 of the process unit 44, based on image data of respective colors transmitted from a computer 70 (refer to FIG. 2) that will be described below. Thereby, toner images that correspond to images to be formed on surfaces of the photosensitive drums 50 are formed.

When the toner images formed on the surfaces of the photosensitive drums 50 passes through transfer positions I with respect to the belt 36, the toner images on the photosensitive drums 50 are transferred on the sheet 16 passing to the transfer positions I. As a result, images are formed on the sheet 16. As the belt 36 is moved, images of respective colors are consecutively formed on the sheet 16. The sheet 16 having the images formed thereon is sent to a photographic fixing unit 58 in which the images are then fixed, and the sheet 16 is then conveyed to discharge rollers 60 (which are an example of a first rotary member).

The discharge rollers 60 are connected to a driver 64 (which is an example of a control unit). The driver 64 controls the discharge rollers 60 in at least three states of a first rotating state of rotating the discharge rollers 60 in a first direction D1, a second rotating state of rotating the discharge rollers in a second direction D2 and a stopping state of stopping rotation of the discharge rollers.

Figure 9:
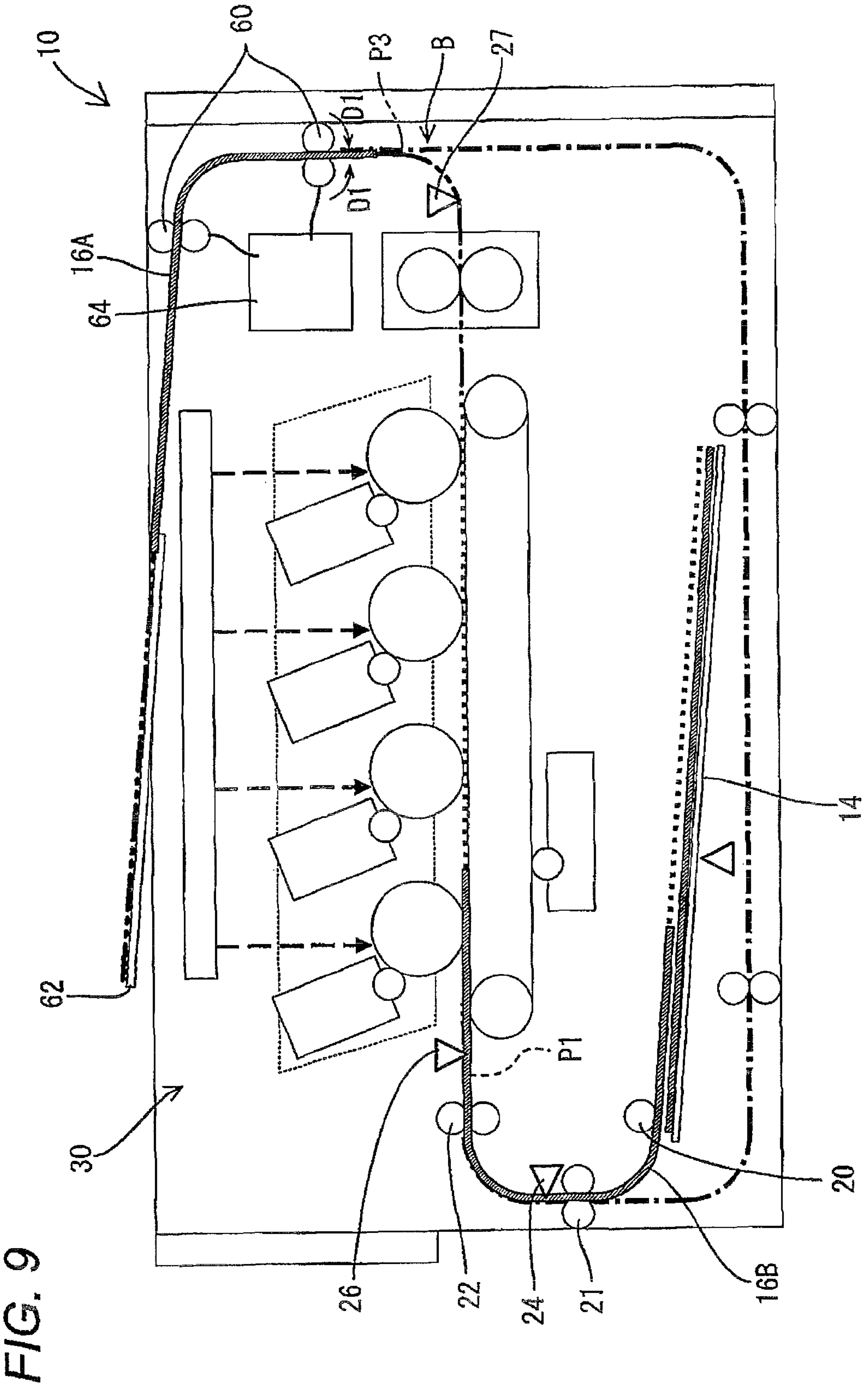
FIG. 9 illustrates an operation of the printer 10.

As shown in FIG. 9, the driver 64 controls the discharge rollers 60 in the first rotating state, thereby discharging the sheet 16 to the sheet discharge tray 62. In other words, the sheet 16 is conveyed from the image forming unit 30 to the sheet discharge tray 62 through a discharge path P3 (which is an example of a first conveyance path: double-dotted and dashed line) configured by the photographic fixing unit 58 and the discharge rollers 60. An optical sensor 27 is arranged between the photographic fixing unit 58 and the discharge rollers 60 of the discharge path P3. The optical sensor 27 detects a position of the sheet 16 that is conveyed through the discharge path P3. When the sheet 16 exists at the position of the discharge path P3 at which the optical sensor 27 is arranged, the optical sensor 27 becomes on, otherwise the optical sensor becomes off.

Figure 10:
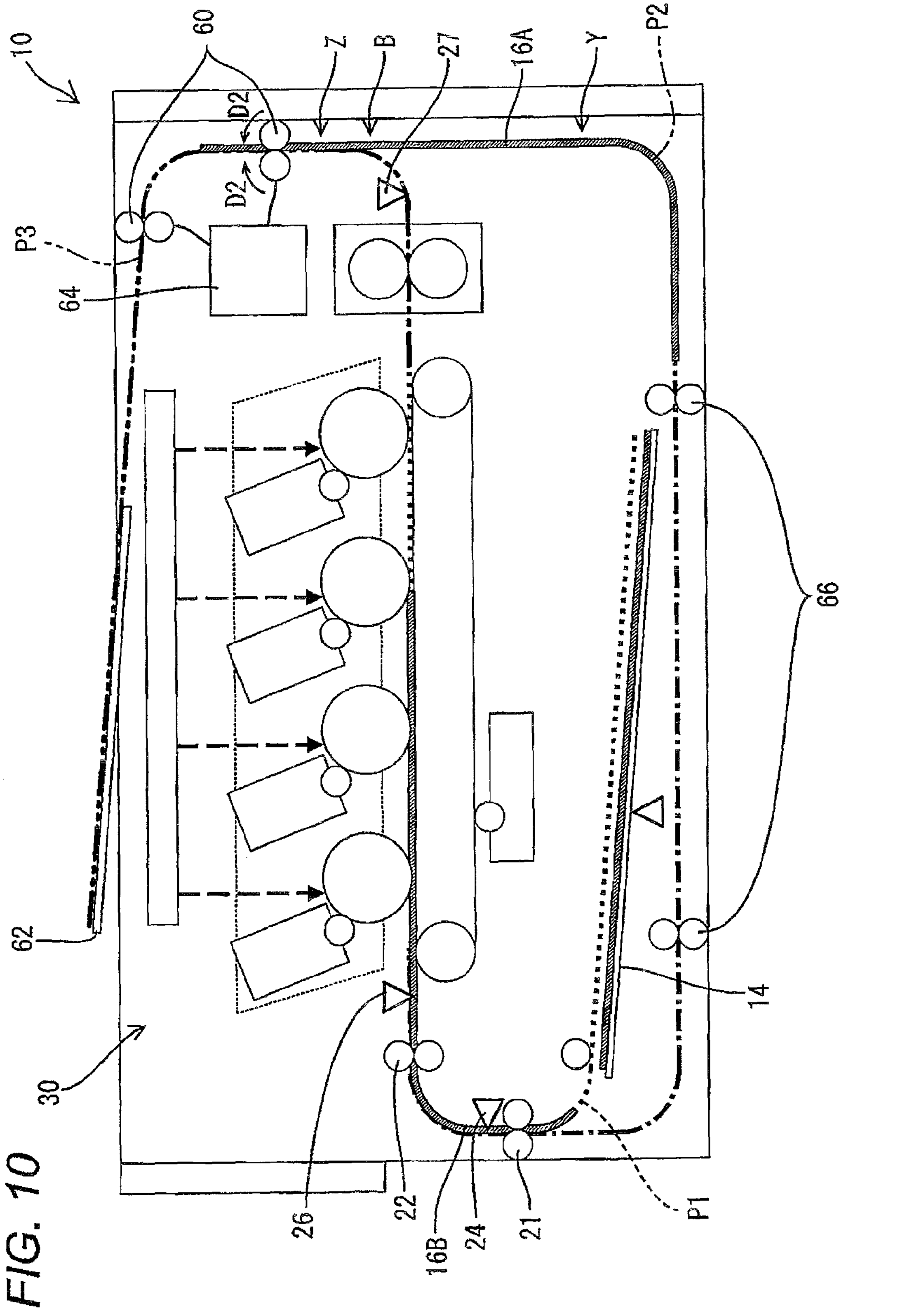
FIG. 10 illustrates an operation of the printer 10.
Figure 11:
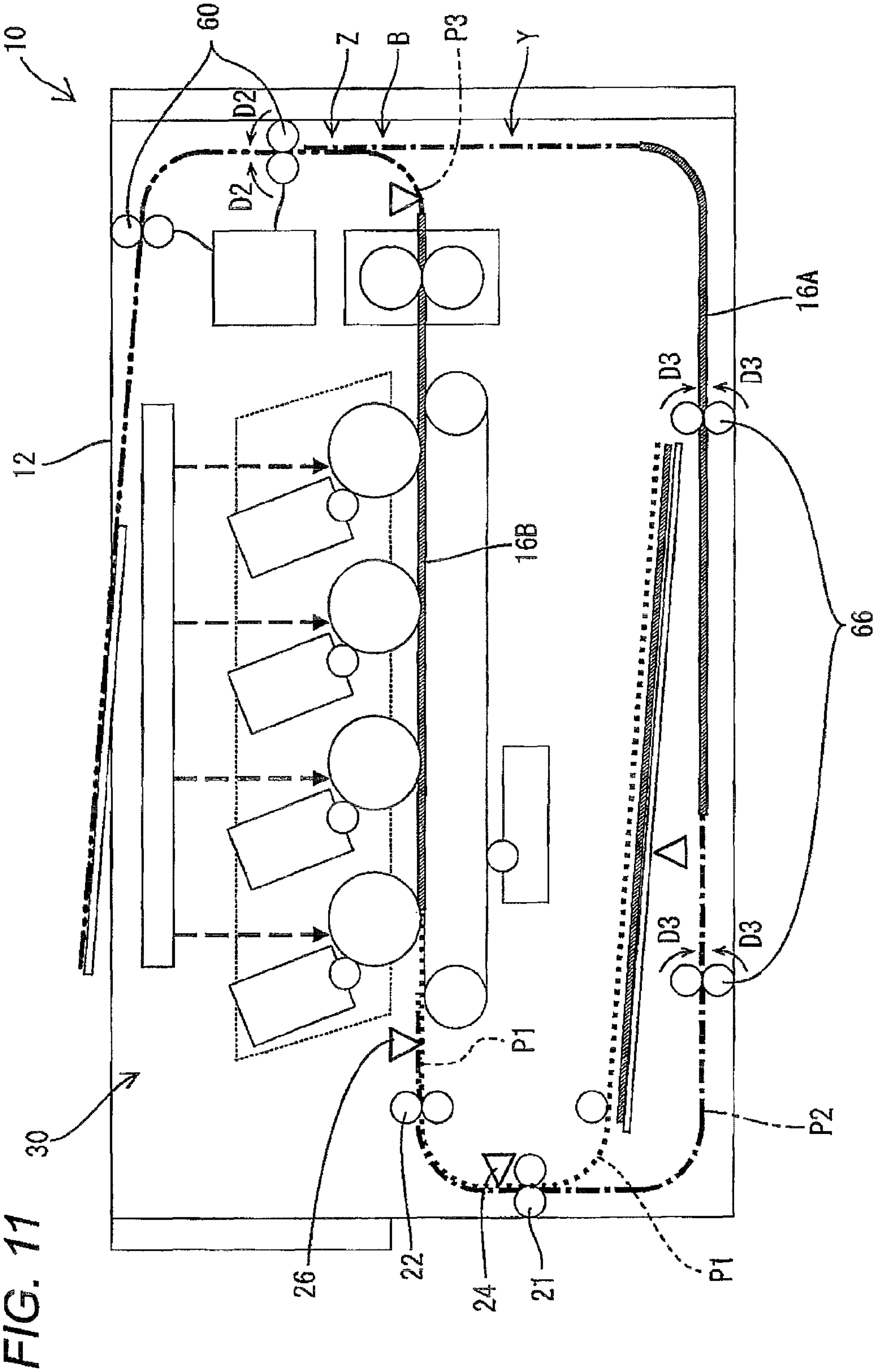
FIG. 11 illustrates an operation of the printer 10.
Figure 12:
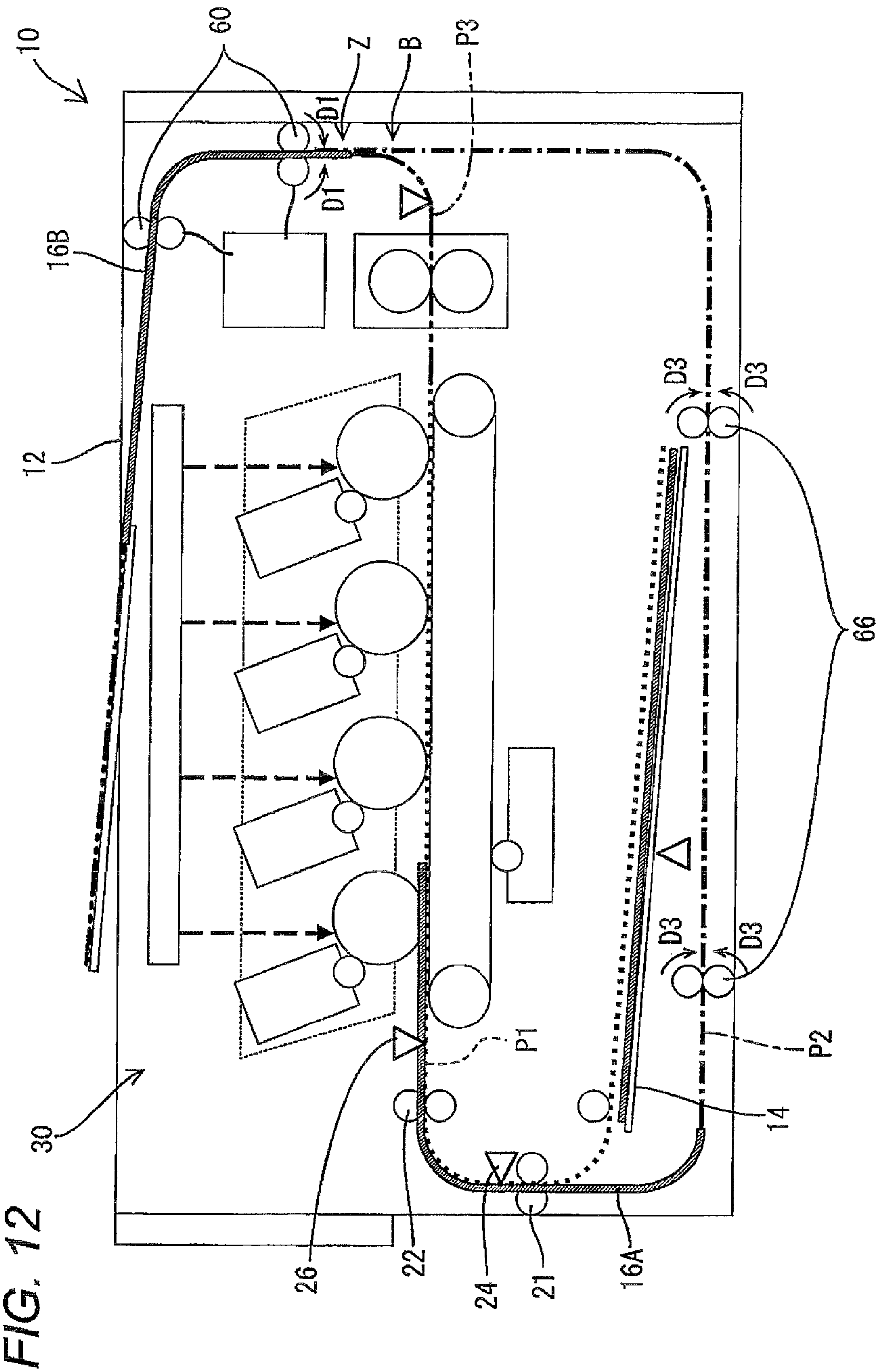
FIG. 12 illustrates an operation of the printer 10.

In addition, the driver 64 controls the discharge rollers 60 in the first rotating state and then controls the discharge rollers 60 in the second rotating state after a rear end portion of the conveyance direction of the sheet 16 passes to a turning point B (refer to FIG. 9) between the optical sensor 27 and the discharge rollers 60 of the discharge path P3 (refer to FIG. 10). Thereby, as shown in FIGS. 11 and 12, it is possible to convey the sheet 16 to DX rollers 66 (which are an example of a second rotary member), and the sheet 16 is conveyed to the register rollers 22 with being reversed through the DX rollers 66 and is then re-conveyed to the image forming unit 30. In other words, the sheet 16 is re-conveyed to the image forming unit 30 through a second feeding path P2 (which is an example of a second conveyance path: one-dotted and dashed line) configured by the discharge rollers 60, the DX rollers 66 and the register rollers 22. The second feeding path P2 passes below the feeder tray 14 and the image forming unit 30 in the casing 12. The second feeding path P2 is overlapped with the discharge path P3 between the turning point B and the discharge rollers 60 (hereinafter, a part at which the second feeding path P2 between the discharge rollers 60 of the two pairs of the discharge rollers 60, which are closer to the turning point B, and the turning point 13 and the discharge path P3 are overlapped is referred to as an overlapped part Z). Therefore, the second feeding path P2 can be referred to as a conveyance path through which the sheet 16 is conveyed from the overlapped part Z to the image forming unit 30. In addition, the second feeding path P2 is overlapped with the first feeding path P1 at the register rollers 22. Therefore, it can be said that the optical sensors 24, 26 are arranged not only on the first feeding path P1 but also on the second feeding path P2, and the optical sensors 24, 26 also detect whether the sheet 16 exists on the second feeding path P2.

Furthermore, the driver 64 controls the discharge rollers 60 in the first rotating state, controls the discharge rollers 60 in the second rotating state (refer to FIG. 10) after the sheet 16 passes to the turning point B (refer to FIG. 9) and controls the discharge rollers 60 in the stopping state when the sheet 16 reaches a position of a sheet 16A, thereby making the sheet 16 stand by at the overlapped part Z (hereinafter, the position of the sheet 16A of FIG. 10 is referred to as a standby position Y). Thereby, it is possible to make the sheet 16 stand by at the standby position Y, before the sheet is again conveyed to the image forming unit 30 after it has been conveyed to the image forming unit 30.

2. Electric Configuration of Printer

Figure 2:
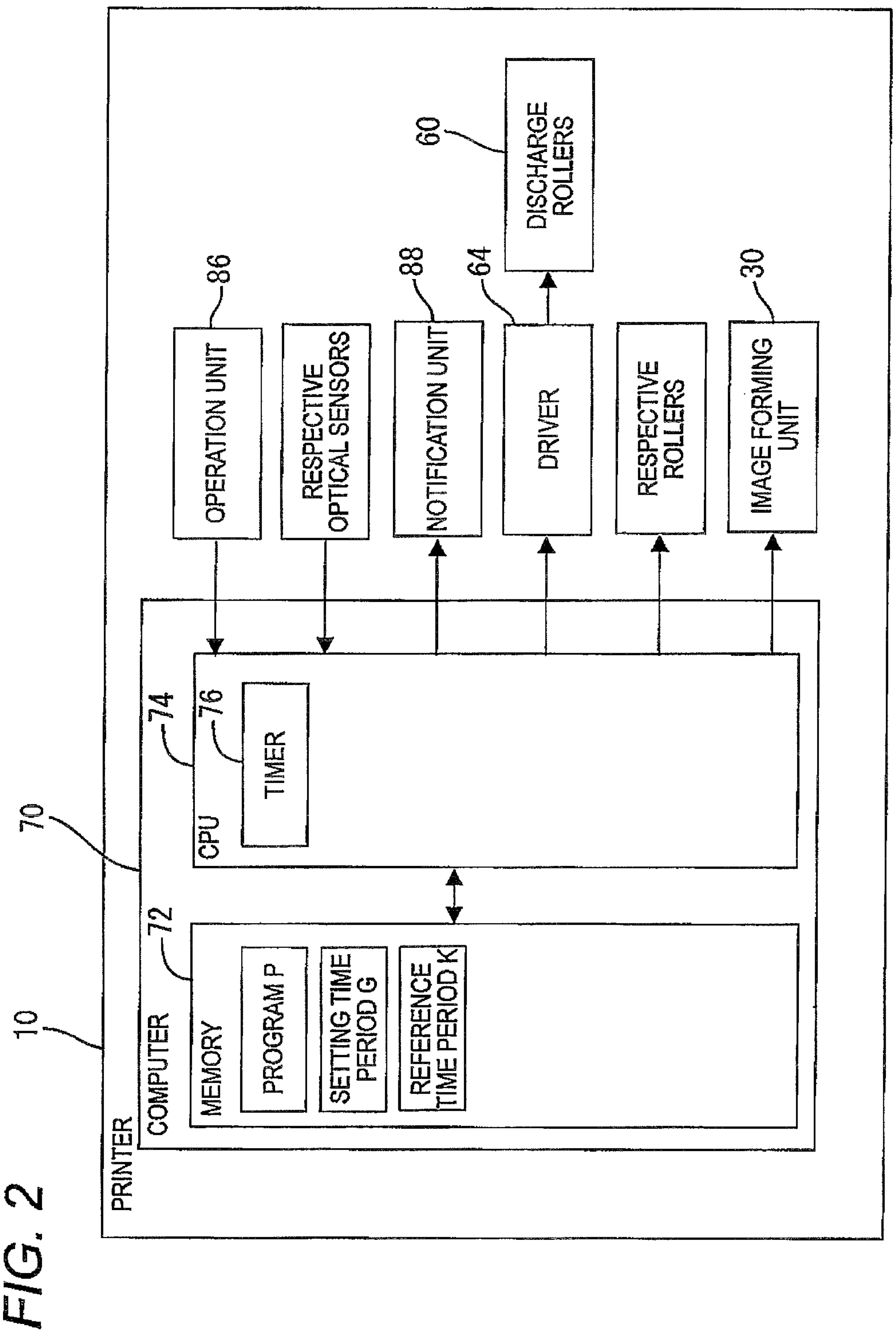
FIG. 2 is a block diagram showing a control system of the printer 10.
Figure 3:
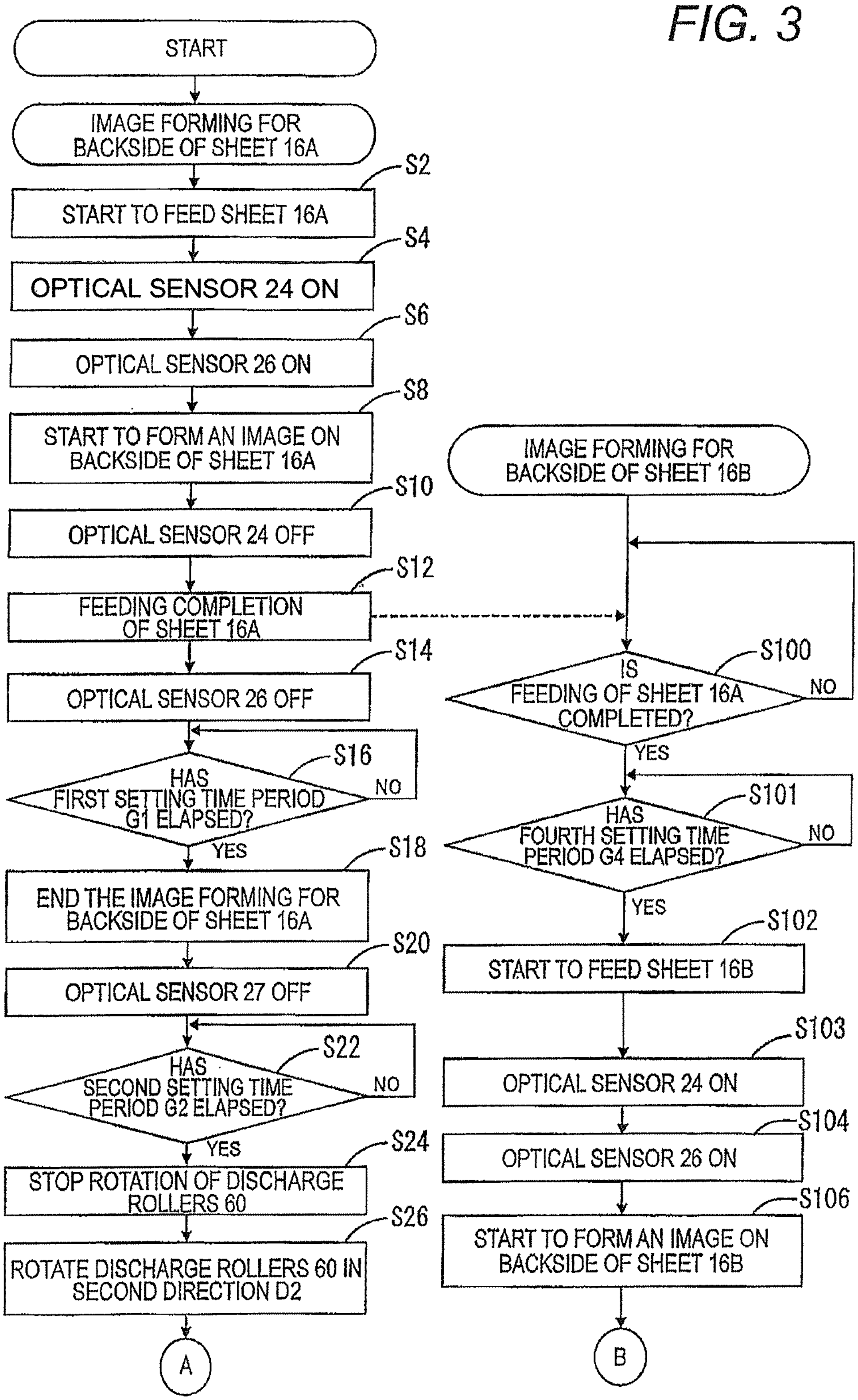
FIG. 3 is a flow chart showing a correction process of the printer 10.
Figure 4:
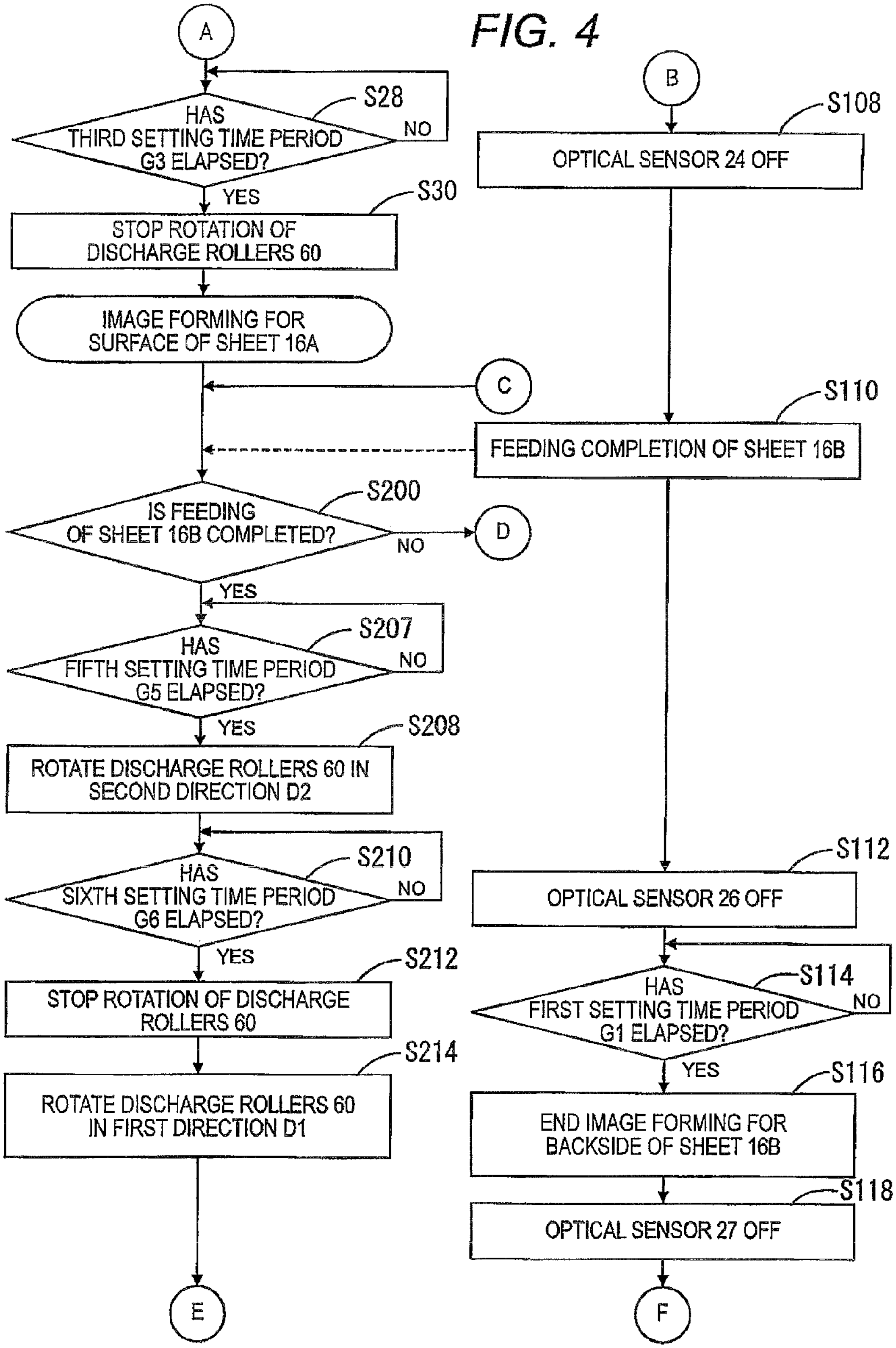
FIG. 4 is a flow chart showing a correction process of the printer 10.
Figure 5:
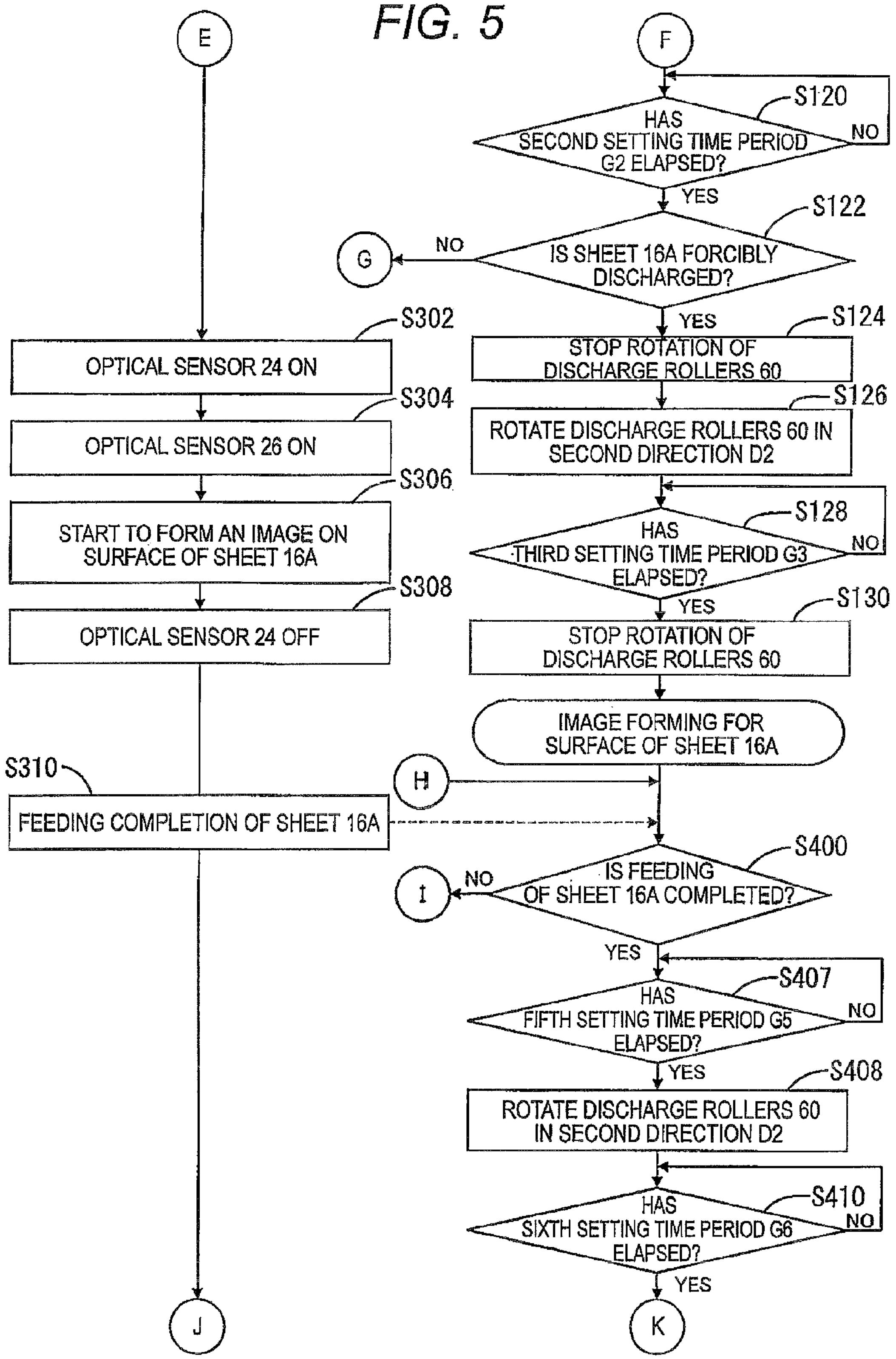
FIG. 5 is a flow chart showing a correction process of the printer 10.
Figure 6:
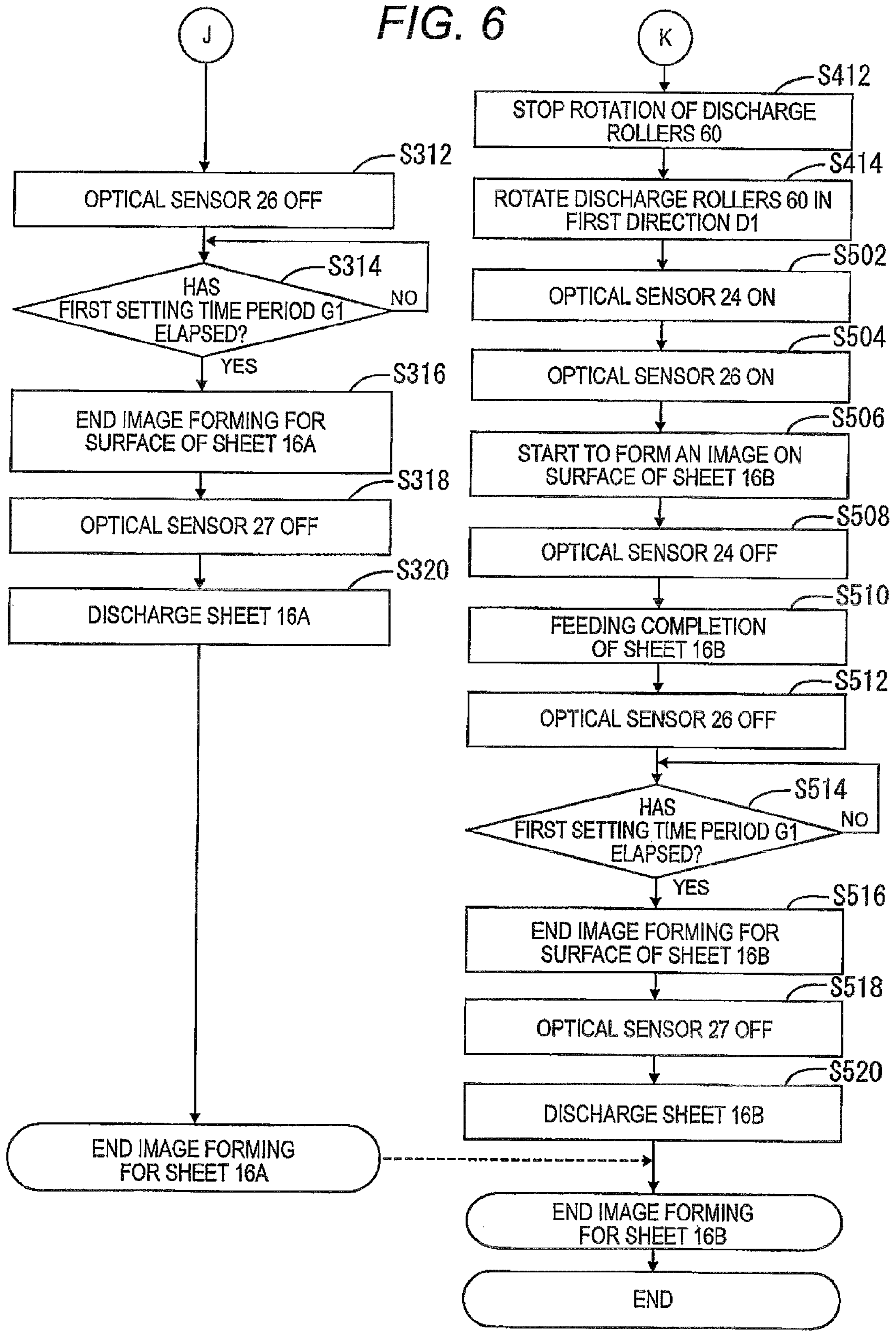
FIG. 6 is a flow chart showing a correction process of the printer 10.
Figure 7:
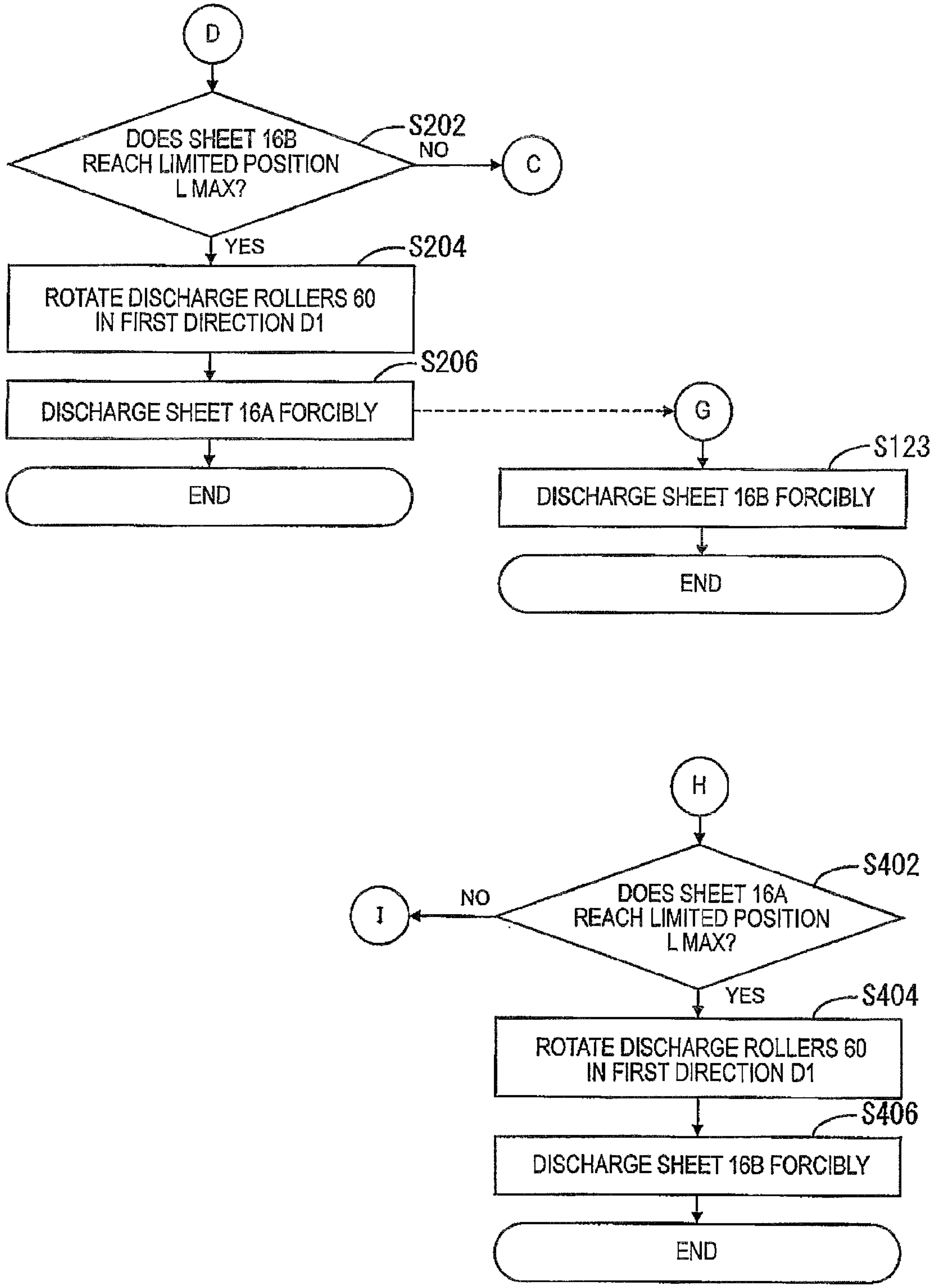
FIG. 7 is a flow chart showing a correction process of the printer 10.

FIG. 2 schematically shows a control system of the printer 10. The printer 10 further includes an operation unit 86, a notification unit 88 and a computer 70. The printer 10 is controlled by the computer 70. The operation unit 86 has a plurality of buttons and inputs instructions of power on/off, one-sided/duplex processing setting, processing startup and the like, which are input by a user, to the computer 70. When abnormality is caused in the printer 10, the notification unit 88 notifies the user of the abnormality by a display of a panel, an alarm sound and the like, based on instructions from the computer 70. The computer 70 has a memory 72 and a CPU 74. The memory 72 stores therein a program P for controlling an operation of the printer 10, various setting values and the like. The CPU 74 is connected to the operation unit 86, the respective optical sensors, the notification unit 88, the driver 64, the respective rollers and the image forming unit 30 and has a function of a timer 76 measuring an elapsed time period T. The CPU 74 controls the states of the discharge rollers 60 through the driver 64. In addition, the CPU 74 controls the operations of the pickup roller 20, the register rollers 22, the DX rollers 66 and the like in connection with the operation of the image forming unit 30. The computer 70 is connected to an external apparatus through a signal line, which is not shown, and temporarily stores printing data, which is input from the external apparatus, in the memory 72. The CPU 74 executes an image forming process for the sheet 16 by using the printing data temporarily stored in the memory 72, in accordance with the program P read out from the memory 72.

3. Image Forming Process

The image forming process of the printer 10 will be described with reference to FIGS. 3 to 12. In this illustrative embodiment, a process will be described which, regarding printing data of four pages pre-stored in the memory 72 of the printer 10, forms images on both sides of two sheets 16A, 16B in order of a backside of the sheet 16A, a backside of the sheet 16B, a surface of the sheet 16A and a surface of the sheet 16B, by using the printing data of the respective pages in order of a second page, a fourth page, a first page and a third page. In the printer 10 of the invention, when images are formed on both sides of the sheet 16, two sheets 16 at most are simultaneously conveyed in the printer 10. In the meantime, when an image forming process is executed for both sides of the sheets 16 regarding printing data of six pages, images are formed on a backside of the first sheet 16, a backside of the second sheet 16, a surface of the first sheet 16, a surface of the second sheet 16, a backside of the third sheet 16 and a surface of the third sheet 16 in corresponding order, by using the printing data of the respective pages in order of a second page, a fourth page, a first page, a third page, a sixth page and a fifth page. In addition, when an image forming process is executed for both sides of the sheets 16 regarding printing data of eight pages, images are formed on a backside of the first sheet 16, a backside of the second sheet 16, a surface of the first sheet 16, a surface of the second sheet 16, a backside of the third sheet 16, a backside of the fourth sheet 16, a surface of the third sheet 16 and a surface of the fourth sheet 16 in corresponding order, by using the printing data of the respective pages in order of a second page, a fourth page, a first page, a third page, a sixth page, a eighth page, a fifth page and a seventh page. In the printer 10 of the invention, a so-called face-down sheet discharge process is performed which discharges the sheets so that a surface of a sheet is directed toward the sheet discharge tray 12 in order from the first sheet 16. Thus, a user can easily check a page sequence of images printed on the sheets 16. In the meantime, the backside of the sheet 16 means a lower surface (i.e., a surface for which the image forming process is first performed) of the sheet 16 stacked in the feeder tray 14 when both sides of the sheet 16 are printed and the surface of the sheet 16 means an upper surface (i.e., a surface for which the image forming process is performed later) of the sheet 16 stacked in the feeder tray 14 when both sides of the sheet 16 are printed.

(Image Forming Process for Backside of Sheet 16*a*)

Figure 8:
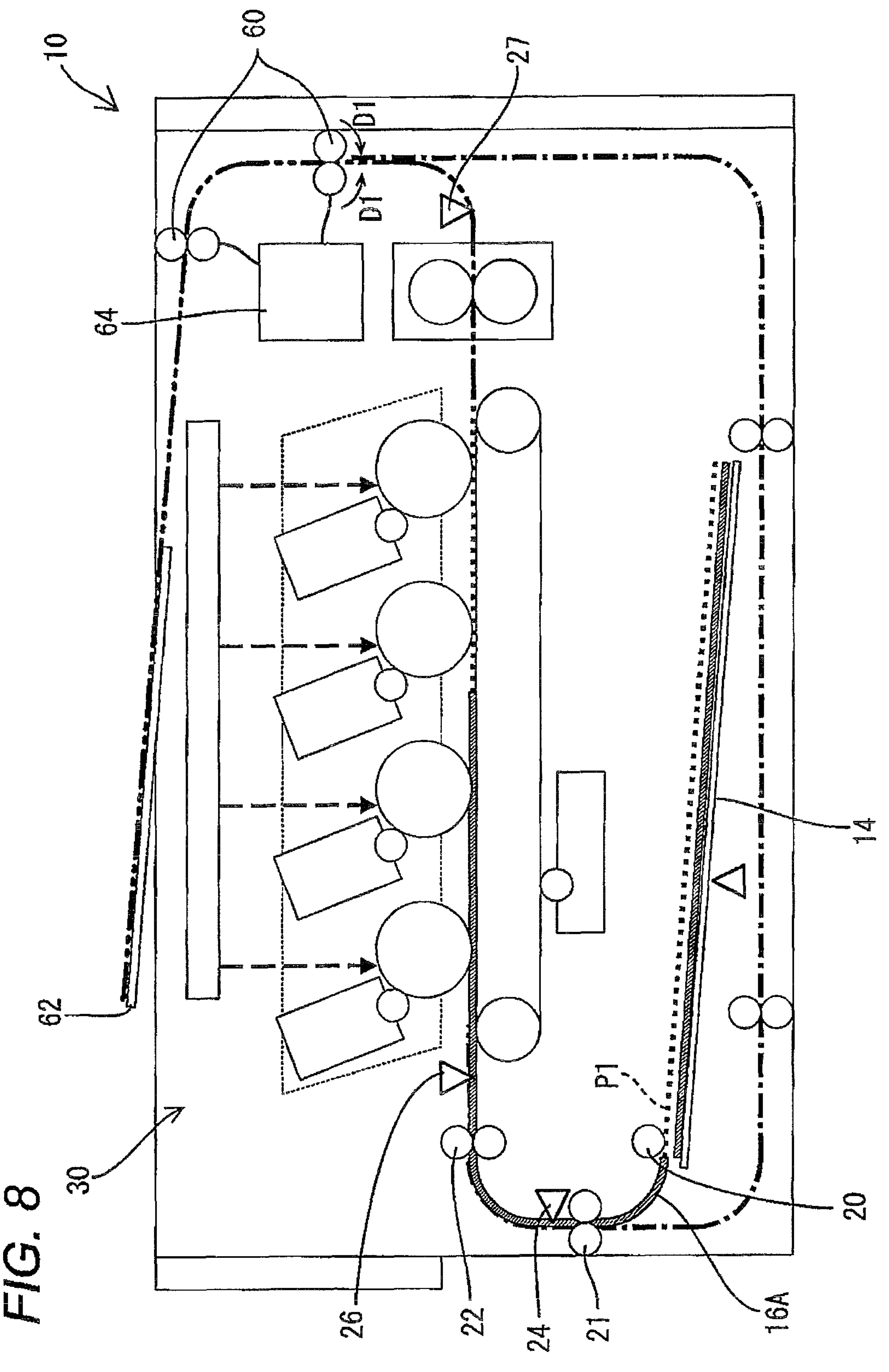
FIG. 8 illustrates an operation of the printer 10.

When a user inputs an instruction to start the image forming process through the operation unit 86, the CPU 74 starts the image forming process for the backside of the sheet 16A, based on printing data of a second page. As shown in FIG. 8, the CPU 74 controls the pickup roller 20 and the register rollers 22 to feed the sheet 16A from the feeder tray 14 to the image forming unit 30 through the first feeding path P1 (step S2). As shown in FIG. 8, when the optical sensors 24, 26 become on (steps S4 and S6) as the sheet 16A is conveyed, the CPU 74 determines that the sheet 16A is conveyed to the image forming unit 30 and starts an image forming operation based on the printing data of a second page (step S8). In the meantime, when the optical sensors 24, 26 are not on for a predetermined time period, the CPU 74 determines that the sheet 16A is folded (jammed) and ends the image forming process. Meanwhile, the determination of ending the image forming process when the optical sensors are not on is made whenever detecting the on/off state of the optical sensors 24, 26, 27 during subsequent operating flows, and the repeated descriptions will be omitted. When the optical sensor 24 is off (step S10), the CPU 74 determines that the feeding of the sheet 16A to the image forming unit 30 is completed (step S12).

When the optical sensor 26 is off (step S14), the CPU 74 stands by for a first setting time period G1 (NO in step S16). The first setting time period G1 is set as a time period during which a rear end portion of the conveyance direction of the sheet 16A passes to the optical sensor 26 and then passes to the image forming unit 30. When the first setting time period G1 elapses (YES in step S16), the CPU 74 determines that the rear end portion of the conveyance direction of the sheet 16A passes to the image forming unit 30 and thus performs control accompanied by the image forming completion for the backside of the sheet 16A, such as control to stop applying voltages to a charger, a transfer roller and the like in the image forming unit 30, which are not shown (step S18).

The CPU 74 controls the driver 64 to rotate the discharge rollers 60 in the first direction D1 before the leading end portion of the conveyance direction of the sheet 16A reaches the discharge rollers 60. Thereby, when the sheet 16A reaches the discharge rollers 60, the sheet 16A is suppressed from colliding with the discharge rollers 60 that are not rotated and thus being folded. Meanwhile, in this illustrative embodiment, when the sheet 16A starts to be fed in step S2, the CPU 74 starts to rotate the discharge rollers 60 in the first direction D1, too (refer to FIG. 8).

When the optical sensor 27 is on and then off (step S20) as the sheet 16A is conveyed, the CPU 74 stands by for a second setting time period (NO in step S22). The second setting time period G2 is set as a time period during which the rear end portion of the conveyance direction of the sheet 16A passes to the optical sensor 27 and then the whole sheet 16A is conveyed toward the sheet discharge tray 62, rather than the turning point B. When the second setting time period G2 elapses (YES in step S22), the CPU 74 determines that the rear end portion of the conveyance direction of the sheet 16A is conveyed toward the sheet discharge tray 62, rather than the turning point B, as shown in FIG. 9, and stops the discharge rollers 60 (step S24).

Next, the CPU 74 rotates the discharge rollers 60 in the second direction D2 (step S26) and stands by for a third setting time period G3 (NO in step S28). The third setting time period G3 is set as a time period during which the sheet 16A is conveyed from the position (refer to FIG. 9), at which the whole sheet 16A is conveyed toward the sheet discharge tray 62, rather than the turning point B, to a standby position Y (refer to FIG. 10), at which the sheet 16A is overlapped with the overlapped part Z. When the third setting time period G3 elapses (YES in step S28), the CPU 74 determines that the sheet 16A has reached the standby position Y, as shown in FIG. 10, stops the rotation of the discharge rollers 60 (step S30) and makes the sheet 16A stand by at the standby position Y.

At the standby position Y, the sheet 16A is held between the DX rollers 66. The DX rollers 66 convey the sheet 16A from the overlapped part Z to the image forming unit 30 and can be rotated in a direction D3 (refer to FIG. 11) of conveying the sheet 16A from the overlapped part Z to the image forming unit 30. However, the DX rollers cannot be rotated in an opposite direction thereto. In the printer 10 of this illustrative embodiment, the sheet 16 is not held between the DX rollers 66 at the standby position Y. Thus, when the image forming process for the sheet 16B by the printer 10 is interrupted due to some causes, the sheet 16A standing by at the standby position Y can be conveyed and collected to the sheet discharge tray 62 by rotating the discharge rollers 60 in the first direction D1. Thereby, when the printer 10 is interrupted, it is possible to improve the convenience of collection of the sheet 16.

In addition, the DX rollers 66 are controlled in connection with the operation of the image forming unit 30. Therefore, if the sheet 16 is held by the DX rollers 66, when the image forming unit 30 starts to operate, the sheet 16 held by the DX rollers 66 is forcibly fed to the image forming unit 30 in connection with the operation of the image forming unit 30, so that it is not possible to delay or stop feeding the sheet 16. In the printer 10 of this illustrative embodiment, the sheet 16 is not held by the DX rollers 66 at the standby position Y. Therefore, when the feeding of the sheet 16B from the feeder tray 14 to the image forming unit 30 is delayed due to some causes, it is possible to feed the sheet 16A to the image forming unit 30 or to stop the feeding in connection with the feeding of the sheet 16B. Thereby, it is possible to securely suppress the sheet 16B, which is being fed from the feeder tray 14, and the sheet 16A, which is being fed from the standby position Y, from interfering with each other in the image forming unit 30 and the like.

In addition, at the standby position Y, the whole sheet 16 is arranged in the discharge path P3 and the second feeding path P2 and does not protrude from the casing 12. Accordingly, it is possible to suppress a user from pull out the sheet 16 standing by at the standby position Y by mistake.

By doing as described above, the image forming process for the backside of the sheet 16A is completed.

(Image Forming Process for Backside of Sheet 16B)

The CPU 74 stands by (NO in step S100) until the feeding of the sheet 16A to the image forming unit 30 is completed (step S12). When the feeding of the sheet 16A to the image forming unit 30 is completed (YES in step S100), the CPU 74 stands by only for a fourth setting time period G4 (NO in step S101). The fourth setting time period G4 is set as a time period during which the rear end portion of the conveyance direction of the sheet 16A passes to the optical sensor 24 and then a distance with the sheet 16B can be secured (a distance with which the sheets 16A, 16B do not collide with each other at the overlapped part Z when the sheet 16A is reversed). When the fourth setting time period G4 elapses (YES in step S101), the CPU 74 starts to feed the sheet 16B from the feeder tray 14 to the image forming unit 30 (step S102), as shown in FIG. 9. In this illustrative embodiment, based on the position information of the rear end portion of the conveyance direction of the sheet 16A, which is detected by the optical sensor 24, a feeding timing of the sheet 16B is determined. Therefore, the interference of the sheet 16A and the sheet 16B is suppressed at the first feeding path P1, the image forming unit 30 and the overlapped part Z. In the meantime, the overlapped descriptions of steps S103 to S120 of the image forming process for the backside of the sheet 16B, which are the same as the steps S2 to S20 of the image forming process for the backside of the sheet 16A, will be omitted.

When the second setting time period G2 elapses (YES in step S120), the CPU 74 determines whether the sheet 16A standing by at the standby position Y is forcibly discharged to the sheet discharge tray 62 (step S122). When the forcible discharge operation is performed for the sheet 16A (YES in step S122), the CPU forcibly discharges the sheet 16B to the sheet discharge tray 62 (step S123). On the other hand, when the forcible discharge operation is not performed for the sheet 16A (NO in step S122), the CPU performs the same processes as the steps S24 to S30 for the sheet 16B (steps S124 to S130) and makes the sheet 16B stand by at the standby position Y. Meanwhile, the CPU 74 performs a determination of step S202, which will be described later, in the image forming process for the backside of the sheet 16B. Thus, the CPU measures a first elapsed time period T1 during which the optical sensor 26 becomes on (step S104) and then becomes off (step S112).

By doing as described above, the image forming process for the backside of the sheet 16B is completed.

(Image Forming Process for Surface of Sheet 16*a*)

The CPU 74 stands by (NO in step S200 and NO in step S202) until the feeding of the sheet 16B to the image forming unit 30 is completed (step S110). When the feeding of the sheet 16B is completed (YES in step S200) before the first elapsed time period T1 elapses a reference time period K (NO in step S202), the CPU stands by for a fifth setting time period G5 (NO in step S207). The fifth setting time period G5 is set as a time period during which the rear end portion of the conveyance direction of the sheet 16B passes to the optical sensor 24 and then a distance with the sheet 16A can be secured. When the fifth setting time period G5 elapses (YES in step S207), the CPU 74 rotates the discharge rollers 60 in the second direction D2 (step S208), as shown in FIG. 11, and thus starts to feed the sheet 16A from the standby position Y to the image forming unit 30. In this illustrative embodiment, based on the position information of the rear end portion of the conveyance direction of the sheet 16B, which is detected by the optical sensor 24, the feeding timing of the sheet 16A is determined. Thus, the interference of the sheet 16A and the sheet 16B is suppressed at the first feeding path P1, the image forming unit 30 and the overlapped part Z.

The CPU 74 stands by for a sixth setting time period G6 during which the discharge rollers 60 are rotated in the second direction D2 and then the rear end portion of the conveyance direction of the sheet 16A is held between the DX rollers 66 beyond the turning point B (NO in step S210). Here, after standing by for the sixth setting time period G6 (YES in step S210), the sheet 16A is conveyed to the first feeding path P1 through the second feeding path P2 (refer to FIG. 11). In addition, the CPU 74 stops the rotation of the discharge rollers 60 before performing the image forming process for the surface of the sheet 16A (step S212) and then rotates the discharge rollers 60 in the first direction D1 (step S214). Thereby, as shown in FIG. 12, the sheet 16B, which is conveyed from the image forming unit 30 in the image forming process for the backside of the sheet 16B, is conveyed to the sheet discharge tray 62 (step S120). In the meantime, the overlapped descriptions of steps S302 to S318 of the image forming process for the surface of the sheet 16A, which are the same as the steps S2 to S20 of the image forming process for the backside of the sheet 16A, will be omitted.

The CPU 74 discharges the sheet 16A having the surface, on which an image is formed by the image forming unit 30, to the sheet discharge tray 62 (step S320) and ends the image forming process for the surface of the sheet 16A. In the meantime, the CPU 74 performs a determination of step S402, which will be described later, in the image forming process for the surface of the sheet 16A. Thus, the CPU measures a second elapsed time period T2 during which the optical sensor 26 becomes on (step S304) and then becomes off (step S312).

When the first elapsed time period T1 being measured reaches the reference time period K while the CPU 74 stands by until the feeding of the sheet 16B is completed (NO in steps S200), the CPU determines that the leading end portion of the conveyance direction of the sheet 16B reaches a limited position Lmax (YES in step S202) and notifies a user of the fact by the notification unit 88 and rotates the discharge rollers 60 in the first direction D1 (step S204). Thereby, the CPU 74 forcibly discharges the sheet 16A standing by at the standby position Y to the sheet discharge tray 62 (step S206).

Figure 15:
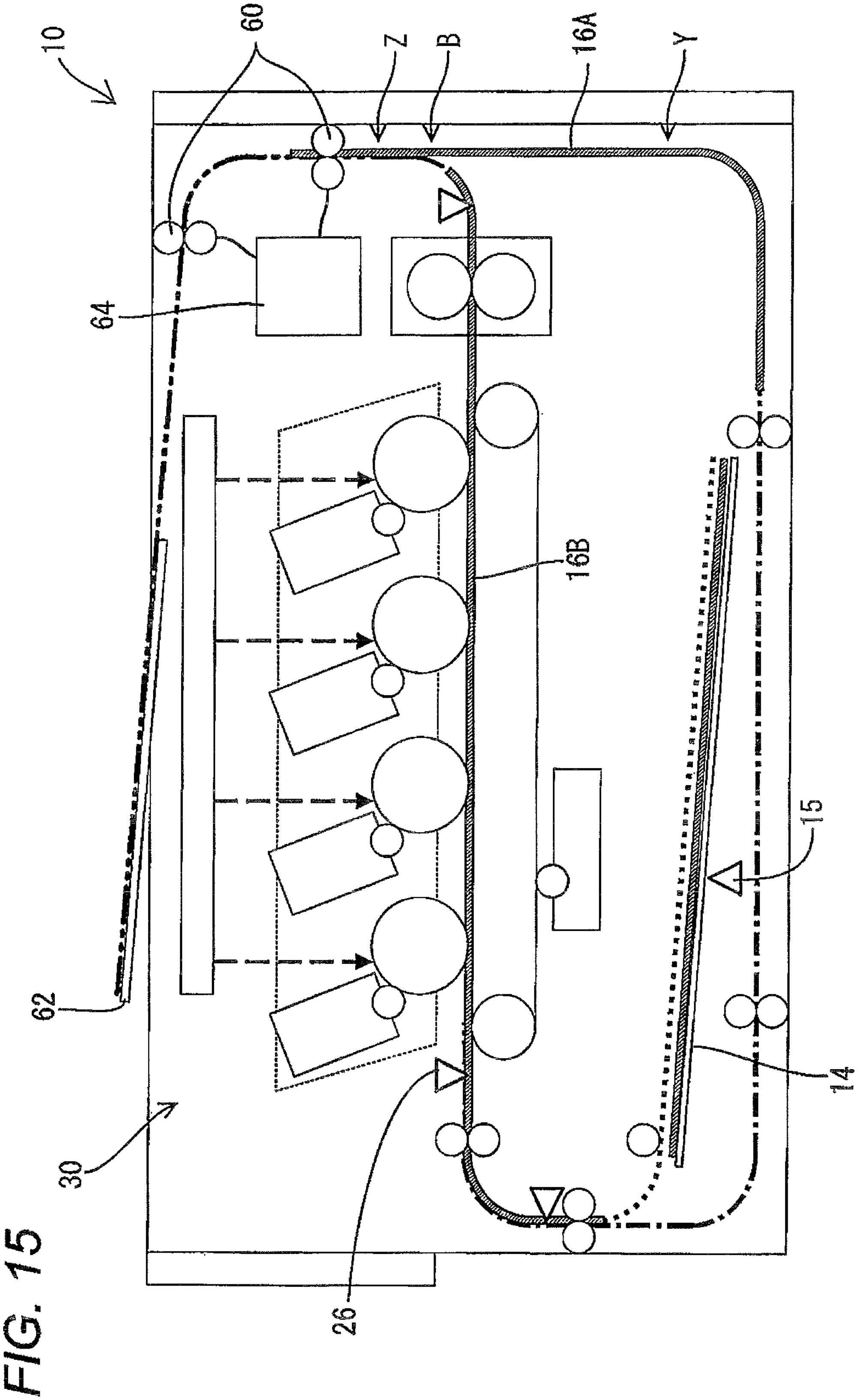
FIG. 15 illustrates a problem of the printer 10.

When the first elapsed time period T1 is greater than the reference time period K, it is expected that the sheet 16B is a nonstandard sheet having a length that is longer than a preset length with respect to a length of the conveyance direction of the sheet 16B, as shown in FIG. 15. In the printer 10 of this illustrative embodiment, when it is expected that the sheet 16B is a nonstandard sheet, the sheet 16B is discharged to the sheet discharge tray 62 without re-conveyance. Thereby, a nonstandard sheet is prevented from being re-conveyed to the image forming unit 30, so that the interference of the sheet 16A and the sheet 16B is prevented in the image forming unit 30.

Here, the reference time period K is set as a differential time period (which is an example of a third time period) obtained by subtracting a second reaching time period (which is an example of a second time period) from a first reaching time period (which is an example of a first time period). The first reaching time period means a time period during which the optical sensor 26 becomes on and then the leading end portion of the conveyance direction of the sheet 16B reaches the discharge rollers 60 (which are the discharge rollers of the two pairs of discharge rollers 60 closer to the turning point B). The second reaching time period means a time period during which the discharge rollers 60 are rotated in the second direction D2 and then the rear end portion of the conveyance direction of the sheet 16B is conveyed to the image forming unit 30 beyond the discharge rollers 60 (which are the discharge rollers of the two pairs of discharge rollers 60 closer to the turning point B). When the reference time period K is set as described above, even though it is intended to rotate the discharge rollers 60 in the second direction D2 to convey the sheet 16A to the image forming unit 30 after the first elapsed time period T1 passes to the reference time period K, the sheet 16B reaches the discharge rollers 60 before the sheet 16A is conveyed to the image forming unit 30. As a result, it is possible to prevent the sheet 16B from being folded in the printer 10, which is caused because the sheet 16B that is forcibly discharged to the sheet discharge tray 62 collides with the discharge rollers 60 being rotated in the second direction D2.

In this illustrative embodiment, when the first elapsed time period T1 passes to the reference time period K and the leading end portion of the conveyance direction of the sheet 16B is beyond the limited position Lmax, the discharge rollers 60 are not rotated in the second direction D2. Thereby, it is possible to prevent the sheet 16B from being folded in the printer 10.

In this illustrative embodiment, the sheet 16A is also forcibly discharged to the sheet discharge tray 62 by using the rotation of the first direction D1 of the discharge rollers 60 for forcibly discharging the sheet 16B to the sheet discharge tray 62. When the sheet 16A and the sheet 16B are fed from the same feeder tray 14, a possibility that not only the sheet 16B but also the sheet 16A will be a nonstandard sheet is high. Therefore, it is necessary to check whether the sheet 16A is a nonstandard sheet and to thus collect the sheet 16A. In this illustrative embodiment, the sheet 16A is forcibly discharged to the sheet discharge tray 62 by using the rotation of the first direction D1 of the discharge rollers 60 for forcibly discharging the sheet 16B to the sheet discharge tray 62. Thereby, it is possible to easily convey and collect the sheet 16A and to thus improve the convenience when collecting the sheet 16.

Furthermore, in the above case, the CPU 74 notifies a user of a report for checking the feeder tray 14 by the notification unit 88. In the feeder tray 14 having fed the sheet 16A or sheet 16B, a possibility that a nonstandard sheet will be also stacked in addition to the sheet 16A or sheet 16B is high. Thus, it is necessary to check whether a nonstandard sheet is stacked in the feeder tray 14. In this illustrative embodiment, a report for checking the feeder tray 14 is notified to a user by the notification unit 88, so that it is possible to suppress a nonstandard sheet from being again fed from the feeder tray 14 to the image forming unit 30.

The CPU 74 is connected to the optical sensor 15 of the feeder tray 14. After detecting that the sheet 16A is a nonstandard sheet, when the feeder tray 14 is opened by a user, the CPU 74 ends the notification of the notification unit 88. When the feeder tray 14 is opened by a user, a possibility that the user will check whether a nonstandard sheet is mixed in the feeder tray 14 is high and a possibility that the nonstandard sheet will exist in the feeder tray 14 after the check is low. Thereby, it is possible to suppress a nonstandard sheet from being again fed to the image forming unit 30 from the feeder tray 14.

The CPU 74 rotates the discharge rollers 60 in the first direction D1 until the leading end portion of the conveyance direction of the sheet 16B reaches the discharge rollers 60. Thereby, when the sheet 16B reaches the discharge rollers 60, it is possible to prevent the sheet 16B from colliding with the discharge rollers 60, which are not rotated, and thus being folded.

The CPU 74 preferably rotates the discharge rollers 60 in the first direction D1 until the leading end portion of the conveyance direction of the sheet 16B reaches the turning point B, i.e., the overlapped part Z. Thereby, the sheet 16A which will be discharged to the sheet discharge tray 62 can be conveyed to the sheet discharge tray 62, rather than the turning point B, until the leading end portion of the conveyance direction of the sheet 16B reaches the turning point B. Thus, it is possible to suppress the sheet 16A or sheet 16B from being folded in the printer 10, which is caused because the sheet 16A and the sheet 16B are overlappingly conveyed at the overlapped part Z during the forcible discharge.

By doing as described above, the image forming process for the surface of the sheet 16A is completed.

(Image Forming Process for Surface of Sheet 16B)

The CPU 74 stands by (NO in step S400 and NO in step S402) until the feeding of the sheet 16A to the image forming unit 30 is completed (step S310). When the feeding of the sheet 16A is completed (YES in step S400) before the second elapsed time period T2 passes to the reference time period K (NO in step S402), the CPU stands by for a fifth setting time period G5 (NO in step S407). Here, the fifth setting time period G5 is set as a time period during which the rear end portion of the conveyance direction of the sheet 16A passes to the optical sensor 24 and then a distance with the sheet 16B can be secured. When the fifth setting time period G5 elapses (YES in step S407), the CPU 74 rotates the discharge rollers 60 in the second direction D2 (step S408) to feed the sheet 16B to the image forming unit 30 from the standby position Y. In this illustrative embodiment, based on the position information of the rear end portion of the conveyance direction of the sheet 16A, which is detected by the optical sensor 24, a feeding timing of the sheet 16B is determined. Therefore, the interference of the sheet 16A and the sheet 16B is suppressed at the first feeding path P1, the image forming unit 30 and the overlapped part Z.

The CPU 74 stands by for a sixth setting time period G6 during which, after the discharge rollers 60 are rotated in the second direction D2, the rear end portion of the conveyance direction of the sheet 16B passes to the turning point B and is then held between the DX rollers 66 (NO in step S410). Here, after standing by for the sixth setting time period G6 (YES in step S410), the sheet 16B is conveyed to the first feeding path P1 through the second feeding path P2 by the DX rollers 66. In addition, before performing the image forming process for the surface of the sheet 16B, the CPU 74 stops the rotation of the discharge rollers 60 (step S412) and rotates the discharge rollers 60 in the first direction D1 (step S414). Thereby, the sheet 16A, which is conveyed from the image forming unit 30 in the image forming process for the surface of the sheet 16A, is conveyed to the sheet discharge tray 62 (step S320). In the meantime, the overlapped descriptions of steps S502 to S518 of the image forming process for the surface of the sheet 16B, which are the same as the steps S2 to S20 of the image forming process for the backside of the sheet 16A, will be omitted.

The CPU 74 discharges the sheet 16B having the surface, on which an image is formed by the image forming unit 30, to the sheet discharge tray 62 (step S520) and ends the image forming process for the surface of the sheet 16B.

On the other hand, when the second elapsed time period T2 being measured reaches the reference time period K while the CPU 74 stands by until the feeding of the sheet 16A is completed (NO in step S400), the CPU determines that the leading end portion of the conveyance direction of the sheet 16A reaches the limited position Lmax (YES in step S402), notifies a user of the fact by the notification unit 88 and rotates the discharge rollers 60 in the first direction D1 (step S404). Thereby, the CPU 74 forcibly discharges the sheet 16B, which stands by at the standby position Y, to the sheet discharge tray 62 (step S406).

When the second elapsed time period T2 is greater than the reference time period K, it is expected that the sheet 16A is a nonstandard sheet having a length that is longer than a preset length with respect to a length of the conveyance direction of the sheet 16A. In the printer 10 of this illustrative embodiment, when it is expected that the sheet 16A is a nonstandard sheet, the sheet 16A is discharged to the sheet discharge tray 62 without re-conveyance. Thereby, it is possible to prevent the sheet 16A, which is conveyed via the image forming unit 30, and the sheet 16B, which is conveyed from the standby position Y to the image forming unit 30, from interfering with each other.

Thus, the image forming process for the surface of the sheet 16B is ended and the image forming process for both sides of the sheets 16A, 16B are ended.

4. Effects of this Illustrative Embodiment

In the printer 10 of this illustrative embodiment, the discharge rollers 60 are controlled in at least three states of the first and second rotating states and the stopping state by the driver 64. Therefore, when forming images on both sides of the sheet 16, it is possible to make the sheet 16 having a backside, for which the image forming process has been performed, stand by at the standby position Y by stopping the discharge rollers 60. In addition, it is possible to reverse and re-convey the sheet 16 having a backside, for which the image forming process has been performed, to the image forming unit 30 by controlling the discharge rollers 60 in the second rotating state. Additionally, it is possible to discharge the sheet 16, for both sides of which the image forming process has been performed, to the sheet discharge tray 62 by controlling the discharge rollers 60 in the first rotating state. In the printer 10 of this illustrative embodiment, the above three functions can be realized by the discharge rollers 60. Thus, it is not necessary to provide a mechanism for making the sheet 16 stand by or a mechanism for re-conveying the sheet 16, separately from the discharge rollers 60. Thereby, it is possible to make the printer 10 small.

In many cases, the discharge rollers 60 are generally arranged in the casing 12 adjacent to the sheet discharge tray 62, so that it is possible to easily access from the outside. Therefore, the three functions of the standby at the standby position Y, the re-conveyance to the image forming unit 30 and the discharge to the sheet discharge tray 30 are concentrated. Thus, even when the sheet 16 is folded at the discharge rollers 60 at which the sheet 16 may be easily folded, it is possible to easily collect the sheet 16 through the access from the outside and to thus prevent the convenience from being deteriorated.

Second Illustrative Embodiment

Figure 13:
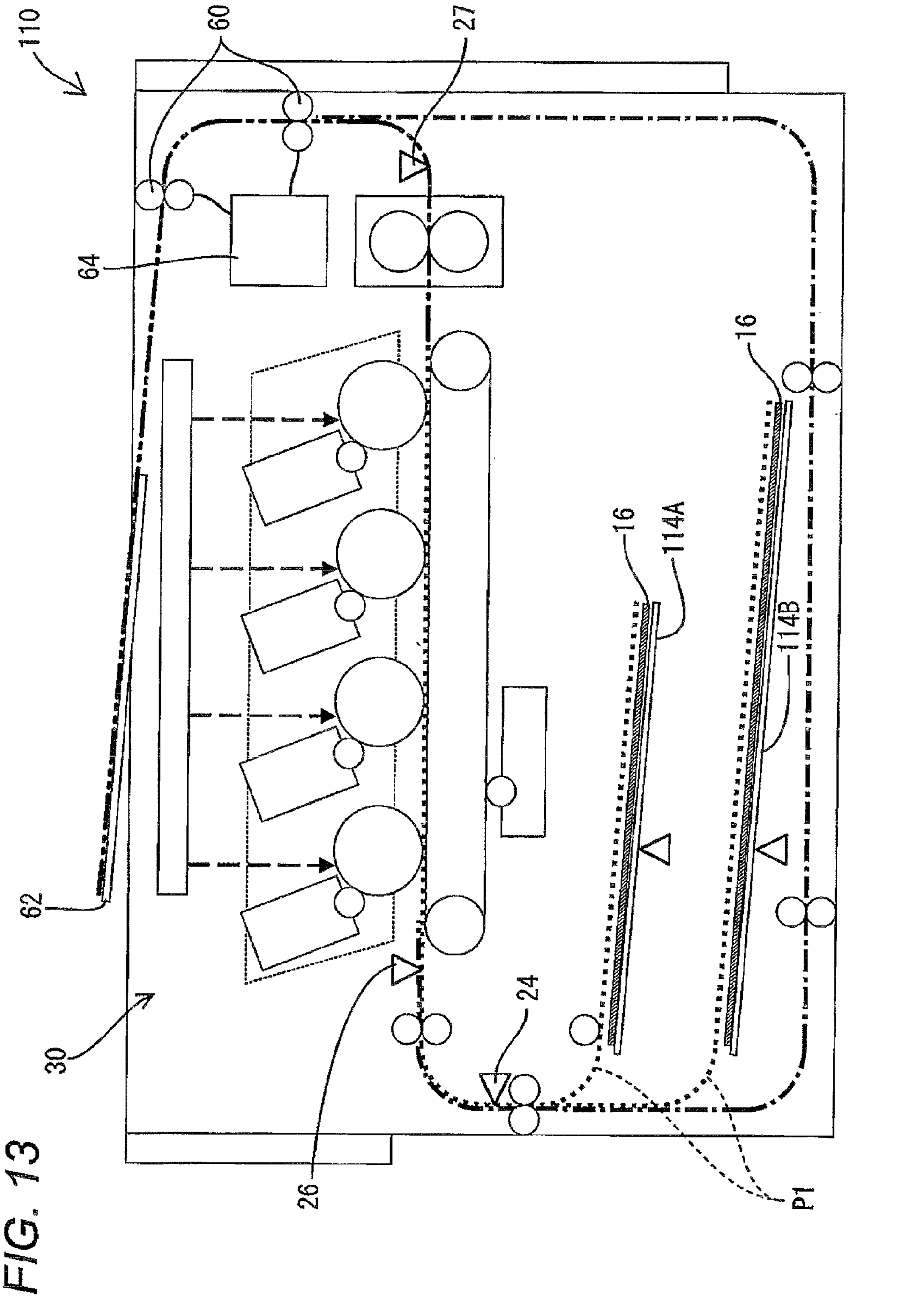
FIG. 13 is a side sectional view of a printer 110.

A second illustrative embodiment 2 of the invention will be described with reference to FIG. 13. A printer 110 of this illustrative embodiment is different from the printer 10 of the first illustrative embodiment, in that a first feeder tray 114A and a second feeder tray 114B are provided in the casing 12. A length (which is an example of a first length) of the conveyance direction of the sheet 16 that is stacked in the first feeder tray 114A is different from a length (which is an example of a second length) of the conveyance direction of the sheet 16 that is stacked in the second feeder tray 114B.

In the printer 110, when feeding the sheets 16 from the feeder trays 114A, 114B to the image forming unit 30, the sheet 16 may be fed to the image forming unit 30 from a feeder tray that is different from a scheduled feeder tray. This erroneous feeding may be caused when changing the feeder trays 114A, 114B feeding sheets to the image forming unit 30, in particular. Even when the sheets 16 are fed to the image forming unit 30 from the feeder trays 114A, 114B that are different from a scheduled feeder tray, the sheets 16 stacked in the feeder trays 114A, 114B are standard sheets and the length of the conveyance direction of the sheet 16 is not longer than a predetermined length. Therefore, it is difficult to detect the erroneous feeding in the printer 10 of the first illustrative embodiment.

In this illustrative embodiment, when it is known in advance that the sheet 16 is fed from which feeder trays 114A, 114B, the reference time period K is set on the basis of the lengths of the conveyance direction of the sheets 16 stacked in the scheduled feeder trays 114A, 114B. Thereby, it is possible to detect whether the sheet 16 is a scheduled sheet.

Third Illustrative Embodiment

A third illustrative embodiment of the invention will be described with reference to FIG. 14. A printer 210 is different from the printer 10 of the first illustrative embodiment, in that a multipurpose tray 214 is provided to an outer side of the casing 12. The multipurpose tray 214 has an optical sensor 215 (which is another example of a second detection unit) that detects whether or not the sheet 16 exists. The multipurpose tray 214 can feed a plurality of sheets and thus has the excellent convenience. However, the multipurpose tray can feed a nonstandard sheet, so that it is not possible to suppress the nonstandard sheet from being fed to the image forming unit 30.

Figure 14:
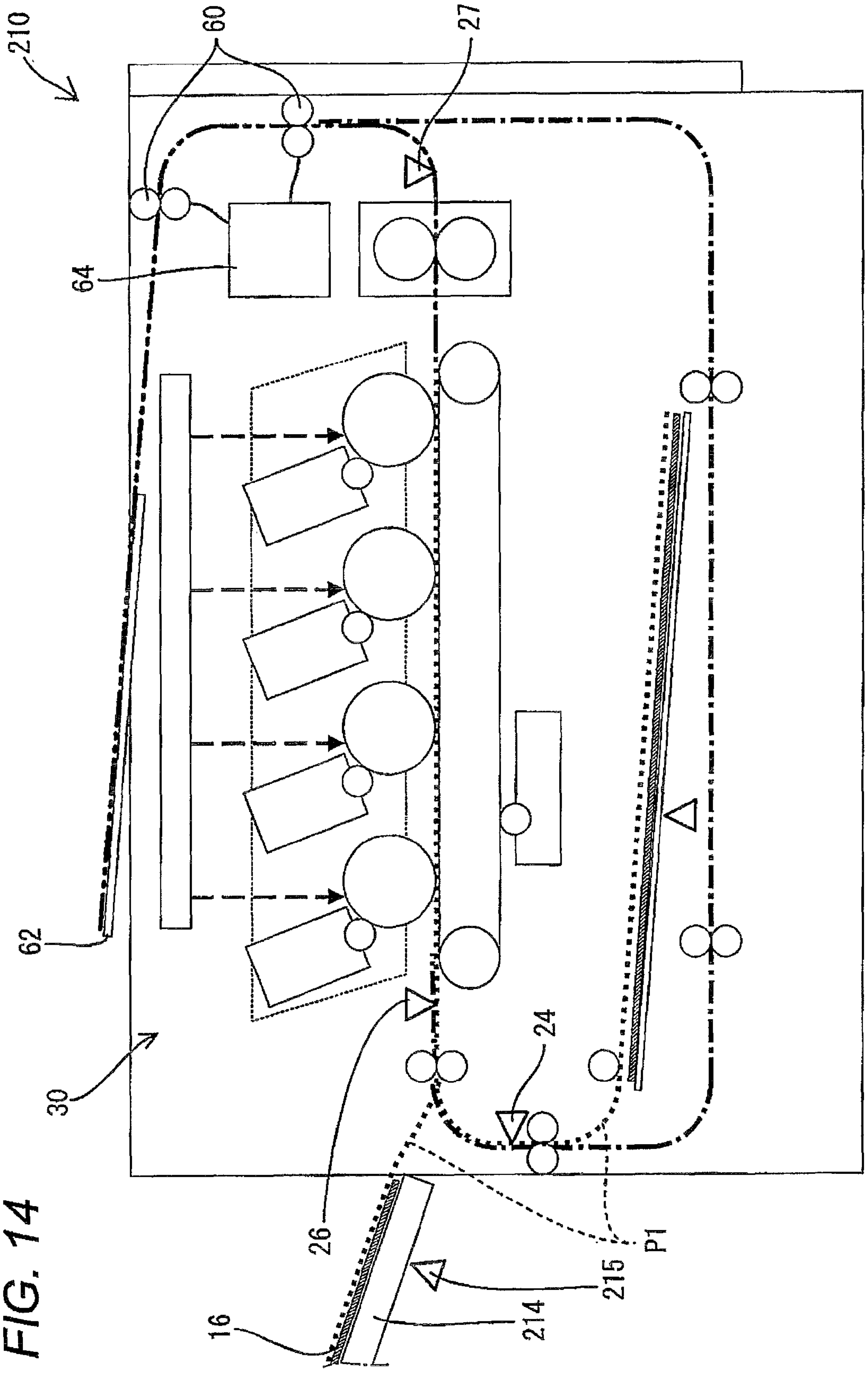
FIG. 14 is a side sectional view of a printer 210.

In this illustrative embodiment, as shown in FIG. 14, the optical sensor 26 is arranged on the first feeding path P1 through which the sheet is fed from the multipurpose tray 214 to the image forming unit 30, and the CPU 74 measures an elapsed time period during which the optical sensor 26 becomes on and off as the sheet 16 is conveyed. The CPU 74 compares the elapsed time period with the reference time period K to detect whether the sheet 16 fed to the image forming unit 30 is a nonstandard sheet or not. Therefore, it is possible to detect whether the sheet 16 fed to the image forming unit 30 is a nonstandard sheet or not.

In the above case, the CPU 74 notifies a user of a report for checking the feeder tray 14 by the notification unit 88. The CPU 74 is connected to an optical sensor 215 of the multipurpose tray 214. After a nonstandard sheet is fed from the multipurpose tray 214 to the image forming unit 30, the CPU 74 ends the notification of the notification unit 88 when a user lifts the sheet 16 from the multipurpose tray 214 and no sheet 16 is temporarily put on the multipurpose tray 214. When a user lifts the sheet 16 from the multipurpose tray 214, a possibility that the user will check whether a nonstandard sheet is mixed in the multipurpose tray 214 is high and a possibility that a nonstandard sheet exists on the multipurpose tray 214 after that is low. Thereby, it is possible to suppress a nonstandard sheet from being again fed from the multipurpose tray 214 to the image forming unit 30.

Other Illustrative Embodiments

The invention is not limited to the above illustrative embodiments described and shown in the drawings. For example, following illustrative embodiments are also included in the technical scope of the invention.

(1) In the above illustrative embodiments, regarding the image forming process for the backside of the sheet 16B, when the sheet 16B is forcibly discharged, the discharge rollers 60 are rotated in the first direction D1 to discharge the sheet 16A to the sheet discharge tray 62. However, the invention is not limited thereto. For example, it may be possible that before the sheet 16B reaches the discharge rollers 60, the discharge rollers 60 are rotated in the second direction D2 to convey the sheet 16A, which stands by at the standby position Y, to the second feeding path P2 facing to the image forming unit 30, rather than the discharge rollers 60. In this case, the rotation of the discharge rollers 60 is switched over from the second direction D2 to the first direction D1 until the sheet 16A reaches the discharge rollers 60. Thereby, it is possible to prevent the sheet 16A from colliding with the discharge rollers 60, which is being rotated in the second direction D2, and thus being folded. In addition, the sheet 16A is conveyed through the second feeding path P2 and the discharge path P3 and then discharged to the sheet discharge tray 62. Thereby, it is possible to pull out the sheet 16B and the sheet 16A from the sheet discharge tray 62 in corresponding order and to thus collect the sheet 16A and the sheet 16B with relatively favorable states.

(2) The reference time period K of the above illustrative embodiments can be also set variously. Typically, in the printer 10, a standard of the useable sheet 16 is set and a sheet of a maximum size whose length is longest in the conveyance direction is set. In this case, the reference time period K may be set on the basis of a limited elapsed time period that is an elapsed time period during which the sheet of a maximum size is conveyed to the image forming unit 30. Thereby, it is possible to easily detect whether the length of the conveyance direction of the sheet 16 is nonstandard.

(3) In addition, the reference time period K may be set as a differential time period (which is an example of a sixth time period) obtained by subtracting a fifth reaching time period (which is an example of a fifth time period) from a fourth reaching time period (which is an example of a fourth time period). The fourth reaching time period means a time period during which the optical sensor 26 becomes on and then the leading end portion of the conveyance direction of the sheet 16B reaches the turning point B. The fifth reaching time period means a time period during which the discharge rollers 60 are rotated in the second direction D2 and then the rear end portion of the conveyance direction of the sheet 16B is conveyed to the image forming unit 30 beyond the turning point B. When the reference time period K is set as described above, it is possible to avoid the interference between the sheet 16B, which is conveyed toward the sheet discharge tray 62 at the overlapped part, and the sheet 16A, which is conveyed toward the image forming unit 30.

(4) In the above illustrative embodiments, when it is detected that the length of the conveyance direction of the sheet 16 is abnormal, the sheet 16 is forcibly discharged. However, the forcible discharge of the sheet 16 is not limited to this case. For example, the sheet 16 may be forcibly discharged when the image forming unit 30 is not ready in conveying the sheet 16 to the image forming unit 30. The image forming unit 30 has a sensor Q (which is an example of a third detection unit) that detects whether the image forming unit 30 is ready before conveying the sheet 16. When the sensor Q detects that the image forming unit 30 is not ready, the CPU 74 forcibly discharges the sheet 16. When the image forming unit 30 is not ready, it is expected that any abnormality is caused in the image forming unit 30. When it is expected that any abnormality is caused in the image forming unit 30, the sheet 16 is forcibly discharged to suppress the image processing, which uses the image forming unit 30 for which it is expected that any abnormality is caused therein, from being repeated.

(5) In the above illustrative embodiments, when the images are formed on both sides of the sheet 16, the configuration has been described in which two sheets 16 at most are simultaneously conveyed in the printer 10. However, the invention can be applied to the printer 10 capable of conveying three or more sheets 16 at the same time. When there is a roller that is operated in connection with the discharge rollers 60 and the sheet 16 is made to stand by through the roller, with three sheets 16, images may be formed on a backside of the first sheet 16, a backside of the second sheet 16, a backside surface of the third sheet 16, a surface of the first sheet 16, a backside of the second sheet 16 and a surface of the third sheet 16 in corresponding order, by using the printing data of the respective pages in order of a second page, a fourth page, a sixth page, a first page, a third page and a fifth page.

(6) In the above illustrative embodiments, in the image forming process for the surface of the sheet 16B, it is determined whether the length of the conveyance direction of the sheet 16A is longer than a predetermined length. However, the length of the conveyance direction of the sheet 16A may be determined in the image forming process for the backside of the sheet 16A. In this case, when it is determined that the length of the conveyance direction of the sheet 16A is longer than a predetermined length, the control may be switched so that the image forming operations for the first and second pages (sheet 16A) are stopped, the sheet 16B is forcibly discharged to the sheet discharge tray 62 and only the image forming operations for the third and fifth pages (sheet 16B) are performed. The sheet 16A, for which the image forming process is first performed, is forcibly discharged, so that the interference between the sheet 16A and the sheet 16B is prevented in the printer 10 and the stopping of the image forming process for both the sheet 16A and the sheet 16B is suppressed.

(7) In the above illustrative embodiments, the printer 10 has been described in which the two pairs of discharge rollers 60 are controlled by the driver 64. However, only the discharge rollers 60 closer to the turning point B may be controlled by the driver 64. Likewise, three or more pairs of discharge rollers 60 may be controlled by the same driver 64.

(8) In the above illustrative embodiments, the printer 10 to which the invention is applied has been described. However, the invention is not limited thereto. For example, the invention may be applied to a scanner that forms an image on the sheet 16.

The technical elements described or shown in the specification or drawings express the technical usefulness individually or by various combinations and are not limited to the combination of the definitions of the claims at the time of filing the application. In addition, the technologies exemplified in the specification or drawings can achieve a plurality of purposes at the same time and one achievement thereof has the technical usefulness.

<Overview of the Invention>

The invention relates to an image processing apparatus. An image processing apparatus of the first invention includes an image processing unit, a discharge unit, a first conveyance path, a second conveyance path, a first rotary member and a control unit. The image processing unit processes an image by using a recording medium. Here, the configuration of "processing an image by using a recording medium" includes processing an image "obtained from" a recording medium and processing an image "to" a recording medium, for example. The recording medium having an image processed in the image processing unit is discharged to the discharge unit. The first conveyance path is a conveyance path for conveying the recording medium from the image processing unit to the discharge unit. The second conveyance path is a conveyance path having a part overlapped with the first conveyance path and for reversing and conveying the recording medium from the overlapped part to the image processing unit through a path different from the first conveyance path. The first rotary member is arranged at the overlapped part. The control unit controls the first rotary member as follows.

(1) The control unit rotates the first rotary member in a first direction when conveying the recording medium to the discharge unit through the first conveyance path.

(2) The control unit rotates the first rotary member in a second direction reverse to the first direction when conveying the recording medium to the image processing unit through the second conveyance path.

(3) The control unit stops rotation of the first rotary member when making the recording medium stand by at the overlapped part.

When performing the control of (3), the control unit of the invention makes the recording medium stand by at a position including at least the overlapped part before the recording medium is conveyed to the image processing unit through the second conveyance path.

According to the above invention, the first rotary member, which is arranged on the first conveyance path and has been used only to discharge a recording medium, is used to realize three functions of discharge, reversal and standby of the recording medium. Thereby, since it is not necessary to separately provide a reversal mechanism or standby mechanism in the apparatus, it is possible to miniaturize the image processing apparatus. In addition, the first rotary member that is used to discharge the recording medium is arranged adjacent to the discharge unit in many cases, so that the first rotary member is arranged at a position that is easily accessible from the outside. Therefore, even when the image processing is interrupted due to some causes, it is easy to collect the recording medium during the reversing operation or standby state. Thus, it is possible to prevent the convenience from being deteriorated.

When the first conveyance path and the second conveyance path are provided, it is possible to perform a so-called "duplex process" of conveying the recording medium to the image processing unit to process an image and then reversing and re-conveying the recording medium to the image processing unit to process an image through the second conveyance path. In the image processing apparatus of a second invention, the first rotary member is used to make the recording medium stand by at the overlapped part, so that when executing the duplex process for a plurality of recording media, a first recording medium is conveyed to the image processing unit to process an image for the first recording medium and then a second recording medium is conveyed to the image processing unit to process an image for the second recording medium before the first recording medium is re-conveyed to the image processing unit through the second conveyance path. The control unit makes the first recording medium stand by at a position including at least the overlapped part before the first recording medium is re-conveyed to the image processing unit through the second conveyance path. Thereby, it is possible to prevent the convenience from being deteriorated when performing the duplex process for a plurality of recording media while making the image processing apparatus small.

The image processing apparatus of a third invention includes a second rotary member that is arranged on the second conveyance path and conveys the recording medium in the second conveyance path to the image processing unit. In this invention, it is preferable that the second rotary member does not sandwich the first recording medium at the standby position at which the control unit makes the first recording medium stand by. Although the second rotary member is rotated in a direction along which the second rotary member conveys the recording medium to the image processing unit, the second rotary member cannot be rotated in a direction along which the second rotary member conveys the recording medium to the opposite side (i.e., toward the overlapped part and the discharge unit). When the second rotary member does not sandwich the first recording medium at the standby position, it is possible to rotate the first rotary member in a first direction to discharge the first recording medium standing by at the standby position to the discharge unit even though the image processing is interrupted due to some causes. Thus, it is possible to improve the convenience when collecting the recording medium.

In the image processing apparatus of a fourth invention, the first recording medium stays in at least one of the first conveyance path and the second conveyance path at the standby position. Like this, since the first recording medium stays in the first conveyance path or second conveyance path at the standby position, it is possible to prevent a user from pulling out the first recording medium standing by at the standby position by mistake, unless the first recording medium protrudes from the discharge unit.

The image processing apparatus of a fifth invention includes a first detection unit that detects a position of the recording medium conveyed to the image processing unit. In this invention, the control unit preferably determines a timing of conveying the first recording medium standing by at the overlapped part to the image processing unit, based on a detection result that the first detection unit detects a position of the second recording medium.

The image processing apparatus of this invention includes the second conveyance path, and the recording medium is conveyed from feeder means of the recording medium to the image processing unit and is also conveyed from the overlapped part to the image processing unit through the second conveyance path. Therefore, the recording medium conveyed from the feeder means may interfere with the recording medium conveyed through the second conveyance path. In the image processing apparatus of this invention, the first conveyance path and the second conveyance path are partially overlapped and the recording medium in the first conveyance path and the recording medium in the second conveyance path may interfere with each other on the overlapped part. In this invention, the first detection unit is provided and a timing of conveying the first recording medium to the image processing unit is determined, based on a detection result of the first detection unit. Thereby, it is possible to suppress the interference of the recording media in the image processing unit and on the overlapped part.

In the image processing apparatus of a sixth invention, the first detection unit detects an elapsed time period during which the first detection unit detects a leading end portion of the conveyance direction of the second recording medium that is conveyed in the image processing unit and then detects a rear end portion of the conveyance direction thereof. In this invention, it is preferable that when the first detection unit detects that the elapsed time period is longer than a reference time period, the control unit rotates the first rotary member in the first direction to convey the second recording medium to the discharge unit.

When the elapsed time period detected by the first detection unit is longer than the reference time period, it is expected that the second recording medium is a nonstandard recording medium whose length of the conveyance direction is longer than a reference length. In this invention, when it is expected that the second recording medium is a nonstandard recording medium, the second recording medium is discharged to the discharge unit without re-conveyance, regardless of whether the second recording medium is scheduled to be re-conveyed. Thereby, it is possible to suppress a variety of problems, which are expected when a nonstandard recording medium is re-conveyed to the image processing unit, for example the interference of the recording media in the image processing unit.

In the image processing apparatus of a seventh invention, the first recording medium is conveyed to the discharge unit by rotation of the first rotary member in the first direction. In this invention, both the first recording medium and the second recording medium are discharged to the discharge unit by the rotation of the first rotary member for discharging the second recording medium to the discharge unit. Thereby, it is possible to simplify a discharge sequence of the recording media and to thus improve the convenience when collecting the recording media.

In the image processing apparatus of an eighth invention, the control unit rotates the first rotary member in the first direction before the second recording medium reaches the first rotary member. Thereby, it is possible to avoid collision of the second recording medium with the first rotary member under stationary state and to thus prevent problems due to the collision, for example jamming problem (a recording medium is folded in a bellows shape).

In the image processing apparatus of a ninth invention, the control unit rotates the first rotary member in the first direction before the second recording medium reaches the overlapped part. Thereby, it is possible to suppress the interference of the recording media and to thus prevent problems due to the interference, for example jamming problem.

In the image processing apparatus of a tenth invention, the control unit controls the first rotary member before the second recording medium reaches the first rotary member, as follows.

(1) The control unit rotates the first rotary member in the second direction to convey the first recording medium standing by at the overlapped part to the second conveyance path facing to the image processing unit, rather than the first rotary member.

(2) The control unit changes the rotation of the first rotary member from the second direction to the first direction.

In this invention, the first recording medium is conveyed to the second conveyance path facing to the image processing unit, rather than the first rotary member, before the second recording medium reaches the first rotary member. Thereby, the second recording medium is avoided colliding with the first rotary member that is being rotated in the second direction, so that it is possible to prevent the problems due to the collision. In addition, the first recording medium is conveyed toward the image processing unit, so that the second recording medium and the first recording medium can be pulled out in corresponding order. Thus, it is possible to collect the recording media with relatively favorable states.

In the image processing apparatus of an eleventh invention, a maximum recording medium having a maximum length of the conveyance direction is set. In this invention, the reference time period is preferably set based on a limited elapsed time period during which the first detection unit detects a leading end portion of the conveyance direction of the maximum recording medium that is conveyed in the image processing apparatus and then detects a rear end portion of the conveyance direction thereof. Thereby, it is possible to detect whether a length of the conveyance direction of the second recording medium is longer than a length of the conveyance direction of the maximum recording medium and to thus detect whether the second recording medium is a nonstandard recording medium.

A time period during which the leading end portion of the conveyance direction of the second recording medium that is conveyed in the image processing unit and in the second conveyance path is detected by the first detection unit and then reaches the first rotary member is set as a first time period and a time period during which the first rotary member is rotated in the second direction and then the first recording medium is conveyed to the second conveyance path facing to the image processing unit, rather than the first rotary member is set a second time period. In this case, in the image processing apparatus of a twelfth invention, the reference time period is set to be shorter than a third time period that is obtained by subtracting the second time period from the first time period. Thereby, it is possible to securely avoid the collision of the second recording medium with the first rotary member that is being rotated in the second direction.

In addition, a time period during which the leading end portion of the conveyance direction of the second recording medium that is conveyed in the image processing unit and in the second conveyance path is detected by the first detection unit and then reaches the overlapped part is set as a fourth time period and a time period during which the first rotary member is rotated in the second direction and then the first recording medium is conveyed to the second conveyance path facing to the image processing unit, rather than the overlapped part is set a fifth time period. In this case, in the image processing apparatus of a thirteenth invention, the reference time period is set to be shorter than a sixth time period that is obtained by subtracting the fifth time period from the fourth time period. Thereby, it is possible to securely avoid the interference of the recording media moving in the reverse direction at the overlapped part.

The image processing apparatus of a fourteenth invention includes a first feeder unit capable of feeding a recording medium having a first length that is a length of the conveyance direction and a second feeder unit capable of feeding a recording medium having a second length that is a length of the conveyance direction and different from the first length, and it is preset whether the second recording medium is fed from which feeder unit. In this invention, the reference time period is preferably determined on the basis of the length of the conveyance direction of the recording medium that is fed by the determined feeder unit.

When it is possible to feed a plurality of recording media having different lengths of the conveyance direction, a recording medium may be fed to the image processing apparatus from the feeder unit that is not originally scheduled to feed the recording medium. In this invention, the reference time period is determined on the basis of the length of the conveyance direction of the recording medium that is fed by the feeder unit that is originally scheduled to feed the recording medium. Thereby, it is possible to detect whether the second recording medium is a recording medium that is originally scheduled to be fed.

The image processing apparatus of a fifteenth invention includes a multipurpose feeder unit capable of feeding a plurality of recording media having different lengths of the conveyance direction. When the multipurpose feeder unit is provided, a nonstandard recording medium, which is not scheduled to be used in the image processing apparatus, may be fed to the image processing unit because the length of the conveyance direction of the recording medium to be fed to the image processing unit is not limited in advance. In this invention, the reference time period is set and it is possible to detect whether the second recording medium is a nonstandard recording medium, based on the reference time period.

In the image processing apparatus of a sixteenth invention, the first detection unit includes a notification unit and the notification unit notifies a user of a report for checking the recording medium in the feeder unit when it is detected that the elapsed time period is longer than the reference time period. A user who has realized the notification of the notification unit checks the recording medium in the feeder unit based on the notification content of the notification unit, so that it is possible to suppress the recording medium whose length of the conveyance direction is abnormal from being again fed to the image processing unit from the feeder unit.

The image processing apparatus of a seventeenth invention includes a second detection unit that detects a first state of indicating opening and shutting of the feeder unit and a second state of indicating whether or not the recording medium in the feeder unit. In this invention, when the second detection unit detects that at least one of the first state and the second state is changed during the notification, the notification unit preferably ends the notification.

In the feeder unit capable of being opened and shut, a user can check whether a recording medium whose length of the conveyance direction is abnormal exists in the feeder unit by opening and shutting the feeder unit. In addition, in the feeder unit that is not opened and shut, such as multipurpose feeder unit, a user can check whether a recording medium whose length of the conveyance direction is abnormal exists in the feeder unit by lifting the recording medium from the feeder unit. In other words, when the first state or second state is changed, it is possible to know that the recording medium in the feeder unit has been checked. In this invention, the second detection unit detects the change of the first state or second state, so that it is possible to suppress the recording medium whose length of the conveyance direction is abnormal from being again fed to the image processing unit from the feeder unit.

In the image processing apparatus of an eighteenth invention, the image processing unit has a third detection unit that detects whether the image processing unit is ready before conveying the second recording medium to the image processing unit. In this invention, when the third detection unit detects that the image processing unit is not ready, the control unit preferably rotates the first rotary member in the first direction to convey the second recording medium to the discharge unit.

When the third detection unit detects that the image processing unit is not ready, it is expected that any abnormality is caused in the image processing apparatus. In this invention, when it is expected that any abnormality is caused in the image processing apparatus, the second recording medium is discharged to the discharge unit without re-conveying the second recording medium, regardless of whether the second recording medium is scheduled to be re-conveyed. Thereby, it is possible to suppress that the image processing is repeated by the image processing apparatus in which it is expected that any abnormality is caused.

In the image processing apparatus of a nineteenth invention, the image processing unit forms an image on the recording medium. Thereby, in an image forming apparatus such as laser printer, it is possible to maintain the convenience while making the apparatus small.

According to the invention, it is possible to prevent the convenience from being deteriorated while making the image processing apparatus small.

What is claimed is:

1. An image processing apparatus comprising:

an image processing unit that processes an image by using a recording medium;

a discharge unit to which the recording medium is discharged;

a first conveyance path for conveying the recording medium from the image processing unit to the discharge unit;

a second conveyance path having a re-conveyed part for conveying the recording medium from a turning point where the re-conveyed part diverges from the first conveyance path to the image processing unit and an overlapped part overlapped with the first conveyance path from the turning point to the discharge unit;

a first rotary member that is arranged at the overlapped part; and a control unit that controls the first rotary member and rotates the first rotary member in a first direction to convey the recording medium in a conveyance direction when conveying the recording medium conveyed from the image processing unit to the discharge unit through the first conveyance path and wherein the control unit rotates the first rotary member in a second direction reverse to the first direction when the recording medium is conveyed to the re-conveyed part after a rear end portion of the recording medium in the conveyance direction is conveyed towards the discharge unit by the rotation of the first rotary member in the first direction, and has passed at the turning point, wherein when the recording medium, in the form of the single sheet, is held at the overlapped part and the re-conveyed part simultaneously, the control unit stops the rotation of the first rotary member in the second direction.

2. The image processing apparatus according to claim 1, wherein a first recording medium is conveyed to the image processing unit to process an image for the first recording medium and then a second recording medium is conveyed to the image processing unit to process an image for the second recording medium before the first recording medium is re-conveyed to the image processing unit through the second conveyance path, and wherein the control unit makes the first recording medium stand by at the position including at least the overlapped part before the first recording medium is re-conveyed to the image processing unit through the second conveyance path.

3. The image processing apparatus according to claim 2, further comprising a second rotary member that is arranged on the re-conveyed part and conveys the recording medium in the re-conveyed part to the image processing unit, wherein the second rotary member does not hold the first recording medium at a standby position at which the control unit makes the first recording medium stand by.

4. The image processing apparatus according to claim 3, wherein the first recording medium stays in at least one of the first conveyance path and the second conveyance path at the standby position.

5. The image processing apparatus according to claim 2, further comprising a first detection unit that detects a position of the recording medium conveyed to the image processing unit, wherein the control unit determines a timing of conveying the first recording medium standing by at the overlapped part to the image processing unit, based on a detection result that the first detection unit detects a position of the second recording medium.

6. The image processing apparatus according to claim 5, wherein the first detection unit detects an elapsed time period during which the first detection unit detects a leading end portion in the conveyance direction of the second recording medium that is conveyed in the image processing unit and then detects a rear end portion of the conveyance direction thereof, and wherein when the first detection unit detects that the elapsed time period is longer than a reference time period, the control unit rotates the first rotary member in the first direction to convey the second recording medium to the discharge unit.

7. The image processing apparatus according to claim 6, wherein the first recording medium is conveyed to the discharge unit by rotation of the first rotary member in the first direction.

8. The image processing apparatus according to claim 6, wherein the control unit rotates the first rotary member in the first direction before the second recording medium reaches the first rotary member.

9. The image processing apparatus according to claim 8, wherein the control unit rotates the first rotary member in the first direction before the second recording medium reaches the overlapped part.

10. The image processing apparatus according to claim 6, wherein before the second recording medium reaches the first rotary member, the control unit rotates the first rotary member in the second direction to convey the first recording medium standing by at the overlapped part to the re-conveyed part, and changes the rotation of the first rotary member from the second direction to the first direction.

11. The image processing apparatus according to claim 6, wherein a maximum recording medium having a maximum length of the conveyance direction is set, and wherein the reference time period is set based on a limited elapsed time period during which the first detection unit detects a leading end portion in the conveyance direction of the maximum recording medium that is conveyed in the image processing apparatus and then detects a rear end portion of the conveyance direction thereof.

12. The image processing apparatus according to claim 6, wherein the reference time period is set to be shorter than a third time period that is obtained by subtracting a second time period from a first time period, the first time period being a time period during which the leading end portion of the second recording medium that is conveyed in the image processing unit and in the second conveyance path is detected by the first detection unit and then reaches the first rotary member and the second time period being a time period during which the first rotary member is rotated in the second direction and then the first recording medium is conveyed to the re-conveyed part facing to the image processing unit, rather than the first rotary member.

13. The image processing apparatus according to claim 6, wherein the reference time period is set to be shorter than a sixth time period that is obtained by subtracting a fifth time period from a fourth time period, the fourth time period being a time period during which the leading end portion of the second recording medium that is conveyed in the image processing unit and in the second conveyance path is detected by the first detection unit and then reaches the overlapped part and the fifth time period being a time period during which the first rotary member is rotated in the second direction and then the first recording medium is conveyed to the re-conveyed part.

14. The image processing apparatus according to claim 6, further comprising a first feeder unit capable of feeding a recording medium having a first length that is a length of the conveyance direction; and a second feeder unit capable of feeding a recording medium having a second length that is a length of the conveyance direction and different from the first length, wherein it is preset that the second recording medium is fed from a determined feeder unit, and wherein the reference time period is determined on the basis of the length of the conveyance direction of the recording medium that is fed by the determined feeder unit.

15. The image processing apparatus according to claim 14, wherein the first detection unit comprises a notification unit, and wherein the notification unit notifies a user of a report for checking the recording medium in the feeder unit when it is detected that the elapsed time period is longer than the reference time period.

16. The image processing apparatus according to claim 15, further comprising a second detection unit that detects a first state of indicating opening and shutting of the feeder unit and a second state of indicating whether or not the recording medium is in the feeder unit, and wherein when the second detection unit detects that at least one of the first state and the second state is changed during the notification, the notification unit ends the notification.

17. The image processing apparatus according to claim 6, further comprising a multipurpose feeder unit capable of feeding a plurality of recording media having different lengths of the conveyance direction.

18. The image processing apparatus according to claim 5, wherein the image processing unit comprises a third detection unit that detects whether the image processing unit is ready before conveying the second recording medium to the image processing unit, and wherein when the third detection unit detects that the image processing unit is not ready, the control unit rotates the first rotary member in the first direction to convey the second recording medium to the discharge unit through the first conveyance path.

19. The image processing apparatus according to claim 1, wherein the image processing unit forms an image on the recording medium.

* * * * *